United States Patent [19]

Rodde et al.

[11] Patent Number: 4,911,612

[45] Date of Patent: Mar. 27, 1990

[54] SECTIONS FOR SHROUDED PROPELLER BLADE

[75] Inventors: Anne-Marie Rodde, Verrieres le Buisson; Joël Reneaux, Paris; Jean-Jacques Thibert, Verrieres le Buisson; Alain E. Vuillet, Bouc Bel-Air, all of France

[73] Assignees: Office National d'Etudes et de Recherches Aerospatiales, Chatillon Cedex; Aerospatiale Societe Nationale Industrielle, Paris, both of France

[21] Appl. No.: 304,791

[22] Filed: Feb. 1, 1989

[30] Foreign Application Priority Data

Feb. 5, 1988 [FR] France ............... 88 01381

[51] Int. Cl.$^4$ .............................. B64C 11/18
[52] U.S. Cl. .................. 416/223 R; 416/242; 416/DIG. 2
[58] Field of Search ............. 416/223 A, 223 R, 228, 416/DIG. 2, 242; 415/181

[56] References Cited

U.S. PATENT DOCUMENTS

| | | | |
|---|---|---|---|
| 4,413,796 | 11/1983 | Bousquet | 244/35 R |
| 4,455,003 | 6/1984 | Hilbig | 244/35 R |
| 4,626,172 | 12/1986 | Mouille et al. | 416/134 |
| 4,626,173 | 12/1986 | Mouille et al. | 426/134 |
| 4,639,284 | 1/1987 | Mouille et al. | 156/213 |
| 4,773,825 | 9/1988 | Rodde et al. | 416/223 |
| 4,834,617 | 5/1989 | Wainauski et al. | 416/242 |

FOREIGN PATENT DOCUMENTS

| | | |
|---|---|---|
| 121462 | 3/1984 | European Pat. Off. . |
| 2510066 | 1/1983 | France . |
| 2590229 | 5/1987 | France . |
| WO81/02557 | 9/1981 | PCT Int'l Appl. ............ 244/34 R |

OTHER PUBLICATIONS

Ira H. Abbott and A. E. Von Doenhoff, "Theory of Wing Sections", McGraw Hill, (1949), pp. 111 to 115.

Primary Examiner—Everette A. Powell, Jr.
Attorney, Agent, or Firm—Fisher, Christen & Sabol

[57] ABSTRACT

This invention relates to a section for shrouded propeller blade, of which the relative thickness is included between 9% and 15%, wherein, the curvature of said section having a maximum value at the leading edge thereof, the upper surface line comprises three successive portions, such that in the first portion, the curvature decreases rapidly from said maximum value at the leading edge to a value close to 20 at a first point of which the reduced abscissa is close to 1%;

in the second portion, the curvature decreases more slowly from said value close to 20 at said first point up to a value close to 1 at a second point, of which the reduced abscissa is close to 25%; and in the third portion, the curvature is less than 1 between said second point and said trailing edge.

23 Claims, 14 Drawing Sheets

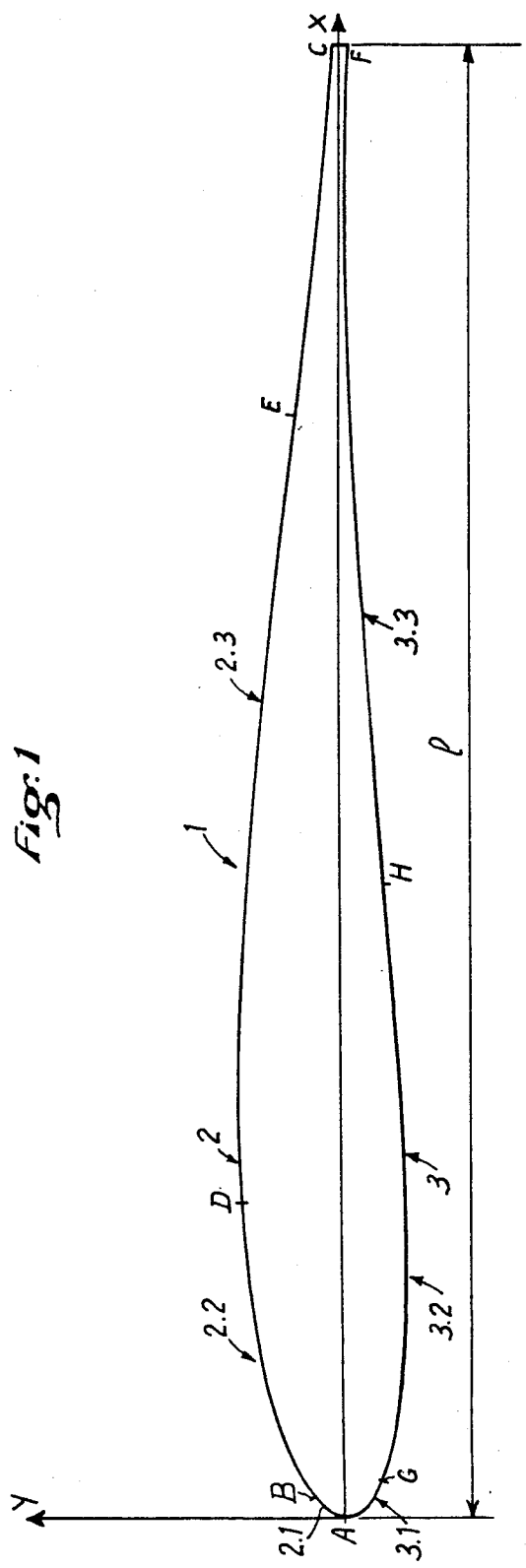

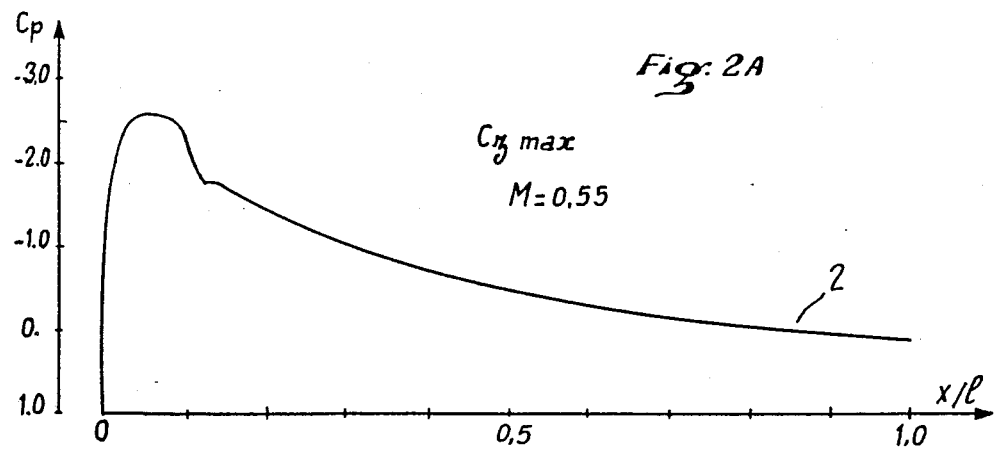
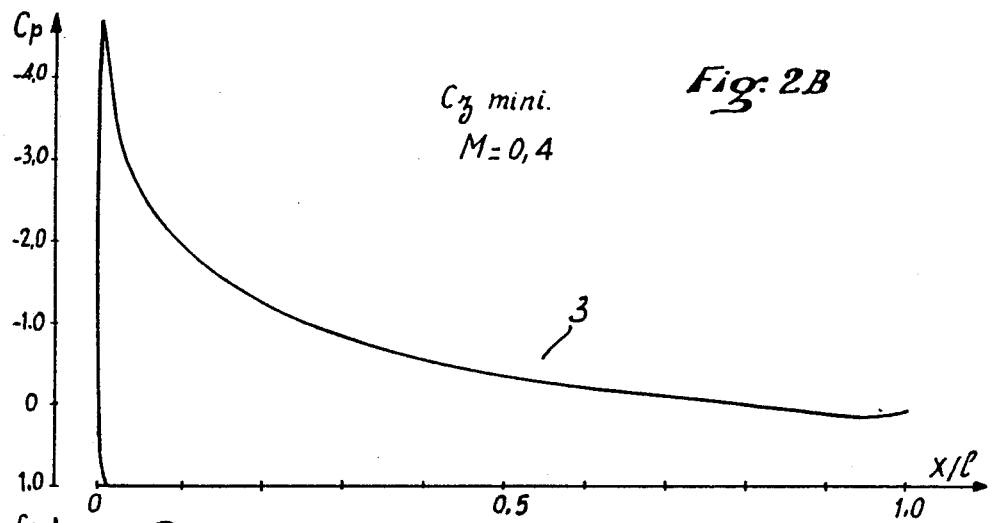
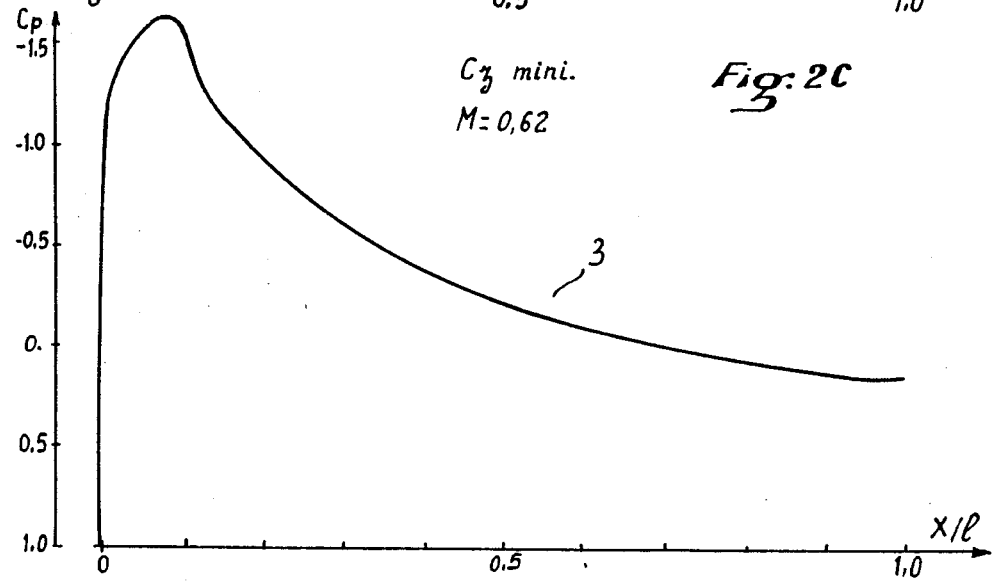

Fig. 7
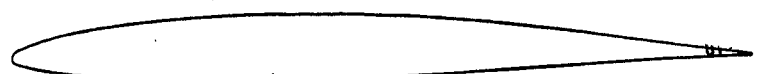
NACA 63A 209
NACA 16 309
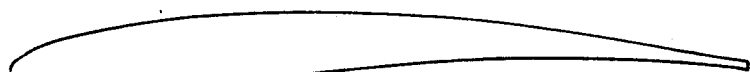
I
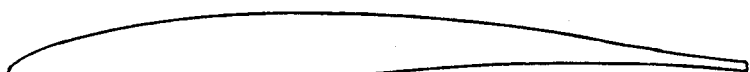
II
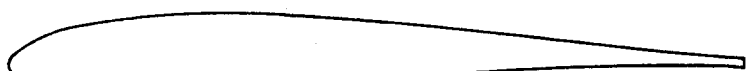
III
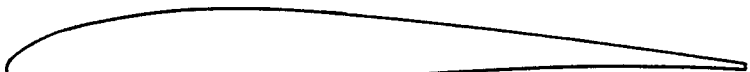
IV
V
VI

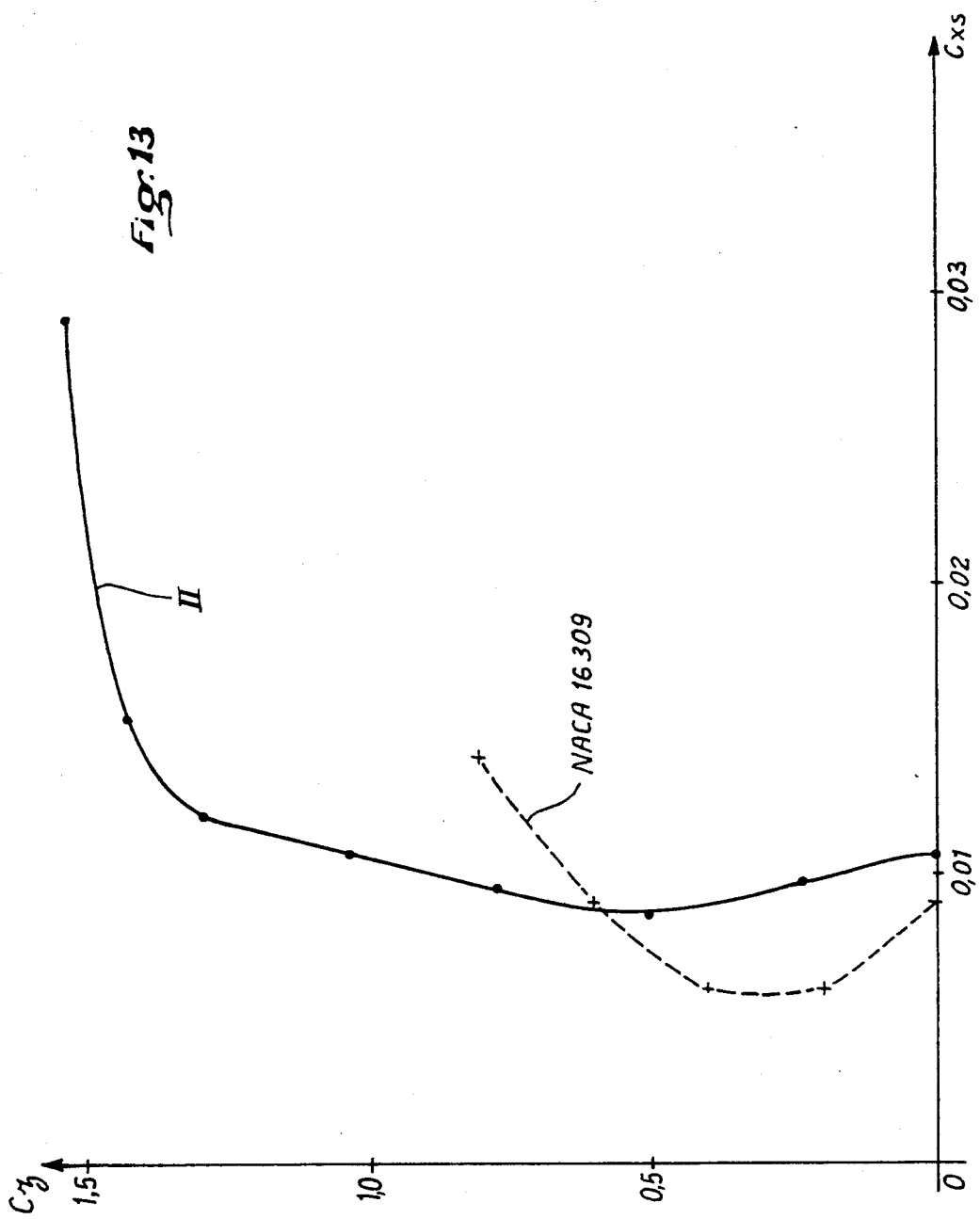

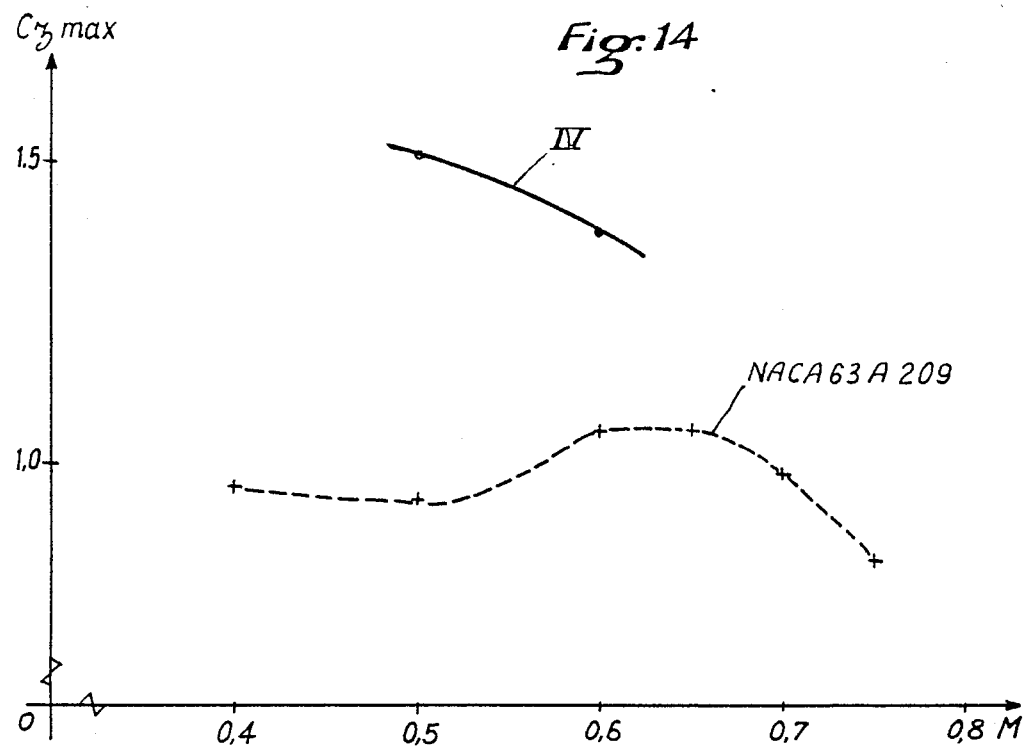
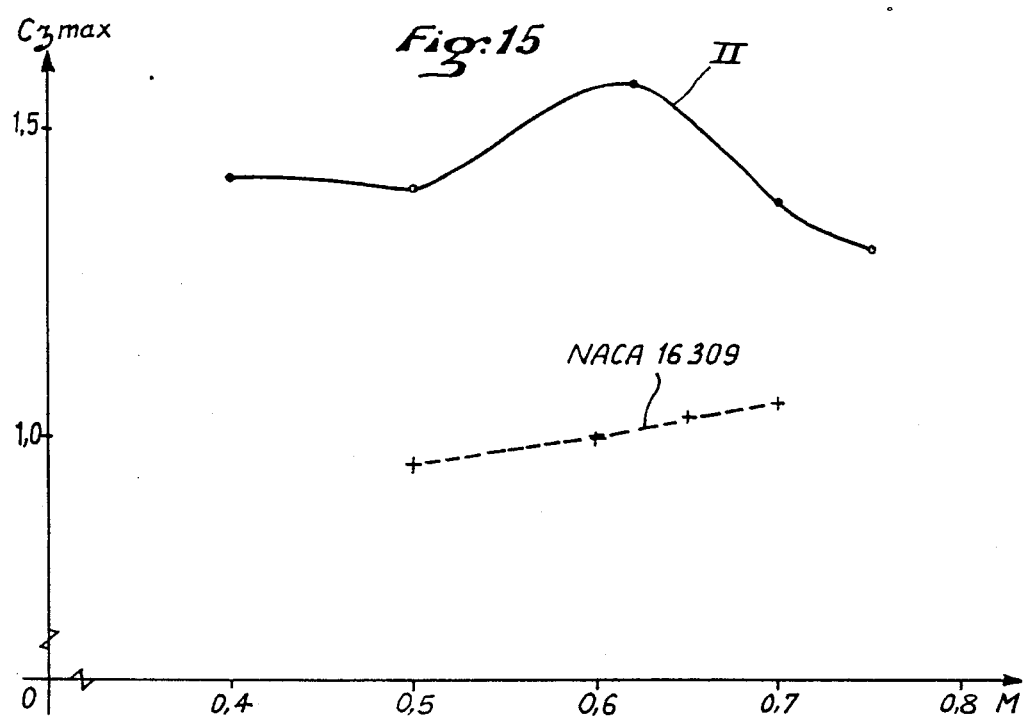

SECTIONS FOR SHROUDED PROPELLER BLADE

FIELD OF THE INVENTION

The present invention relates to profiles for the blades of shrouded propellers. It is particularly, although not exclusively, applicable to the production of shrouded transverse stabilization propellers of helicopters, to that of lifting propellers of air-cushion vehicles, or to the production of shrouded fans with variable pitch.

BACKGROUND OF THE INVENTION

It is known that, for this type of shrouded propeller, the performances are characterized by the "lifting efficiency", also called "figure of merit", which corresponds to stationary operational conditions and which is the ratio between the minimum power in order to obtain a given pull (or thrust) and the real power measured. The expression of this figure of merit is given by the following known formula:

$$FM = \frac{1}{s\sqrt{\sigma}} \frac{T}{P} \sqrt{\frac{T}{\rho \pi R^2}}$$

in which
FM is the figure of merit,
T the desired pull (or thrust),
P the necessary power to be supplied to the propeller,
$\rho$ the density of the air,
R the radius of the propeller, and
$\sigma$ the coefficient of diffusion of the aerodynamic surface flux, this coefficient $\sigma$ being equal to the ratio $$\frac{S_\infty}{S},$$

with $S_\infty$ representing the surface of the flux at downstream infinite and S being the surface of the disc formed by the propeller in rotation.

In order to increase the figure of merit at fixed power and dimensions, it is therefore necessary to increase the pull of the propeller. Now, such pull is expressed, for a unit width section, by the following expression:

$$T = \tfrac{1}{2}\rho Cz l V^2$$

in which
$\rho$ is the density of the air,
Cz the coefficient of lift of the propeller blade section in question,
l the chord of this section, and
V the speed of rotation of the section of the propeller blade with the radius in question.

In order to obtain considerable pulls with small chords, therefore small propeller masses, the sections are therefore made to operate at high speeds and high coefficients of lift.

Furthermore, for an optimalization of the complete blade, it is generally advantageous, from the standpoint of yield, to have, especially in the case of a shrouded propeller, a spanwise distribution of lift, which increases from the hub up to the end of the blade. The end sections, for which the relative speed is highest, therefore also operate with the highest coefficients of lift of adaptation. It is known that the coefficient of lift of adaptation is the coefficient of lift at which the section must work with a minimum coefficient of drag and for which it is defined.

Furthermore, it is known that, for the known sections, the increase in the speed and the coefficient of lift is translated by an increase in the coefficient of drag and this increase is all the more rapid as the Reynolds number is lower, which is the case for the applications envisaged by the present invention.

The use of known sections therefore leads to considerable losses and the yield of a shrouded propeller presenting such a known section is very low.

Moreover, particularly in the case of such a shrouded propeller being intended for controlling the attitude of a helicopter in manoeuvring flight, it must therefore be capable of furnishing as great a thrust as possible in positive pitch and at a certain level in negative pitch, which means that the blade profiles present high maximum and minimum lift coefficients and the range of coefficient of lift around the coefficient of lift of adaptation, for which the coefficient of drag remains low, must be as extensive as possible.

Now, the conventional sections used for shrouded propeller blades, such as NACA 63 or NACA 16 sections or even more recent sections, do not present good performances concerning the coefficients of maximum and minimum lift and the operational ranges around the coefficient of lift of adaptation are very small.

The object of the present invention is therefore a new family of sections for shrouded propeller blade, allowing the complete definition of the blade and giving the propeller very good performances in the various conditions of use, these performances being the following:

coefficient of lift of adaptation varying from 0 to 1 between the root and the end of the blade;
operational Mach number varying between 0.3 and 0.7 between the root and the end;
range of coefficient of lift for which the coefficient of drag remains of small extent around the coefficient of lift of adaptation;
high maximum and minimum coefficients of lift, these performances being obtained in a range of Reynolds numbers varying from $0.5 \times 10^6$ at the root and $1.3 \times 10^6$ at the end.

SUMMARY OF THE INVENTION

To these ends, according to the invention, the section for shrouded propeller blade, of which the relative thickness with respect to the chord is included between 9% and 15%, is noteworthy in that, the curvature of said section having a maximum value at the leading edge thereof included between 47 and 98 as a function of said relative thickness, the upper surface line of said section comprises, from the leading edge to the trailing edge, three successive portions, such that in the first portion, the curvature decreases rapidly from said maximum value at the leading edge to a value close to 20 at a first point of which the reduced abscissa along the chord of the section, counted from the leading edge, is close to 1%;

in the second portion, the curvature decreases more slowly from said value close to 20 at said first point to a value close to 1 at a second point, of which the reduced abscissa along said chord, counted from the leading edge, is close to 25%; and in the third portion, the curvature is less than 1 between said second point and said trailing edge, whilst the lower surface line of said section comprises, from the leading edge to the trailing edge, three successive portions, such that in the first portion, the curvature decreases from said maximum value at the leading edge to a value close to 11 at a third point of which the reduced abscissa along the chord of the section, counted from said leading edge, is close to 2%;

in the second portion, which extends from said third point up to a fourth point of which the reduced abscissa along the chord of the section, counted from said leading edge, is included between 30 and 70%, the curvature continues to decrease from this value close to 11 until it is cancelled; and in the third portion, the curvature is negative and less than 1 in absolute value, up to the trailing edge.

As will be seen in greater detail hereinafter, such an evolution of curvature on the upper surface generates aerodynamic flows making it possible in particular to obtain very low values of the drag at the coefficient of lift of adaptation, as well as noteworthy values for the maximum coefficient of lift. Furthermore, thanks to the evolution of their lower surface line, the sections according to the invention present very good performances for values of the coefficient of lift less than the coefficient of lift of adaptation.

The value COA of the curvature at the leading edge, with respect to the length l of the chord of the section, is advantageously given by the expression (1)
$$COA = a1(e/l) + a2(e/l)^2 + a3(e/l)^3 + a4(e/l)^4 + a5(e/l)^5$$

in which e/l is the maximum relative thickness of the section, and a1, a2, a3, a4 and a5 are constant coefficients.

Said constant coefficients preferably have the following respective values:
a1 = −0.2936.10$^6$
a2 = +0.99839.10$^7$
a3 = −0.12551.10$^9$
a4 = +0.69412.10$^9$
a5 = −0.14276.10$^{10}$ In this way, by application of formula (1) with the above values, it is checked that the curvature at the leading edge varies from 47 to 98 for a maximum relative thickness e/l varying from 9% to 15%.

Furthermore, it is advantageous if, along said second portion of upper surface, the curvature (CO) is given by the expression (2) $CO^{\frac{1}{2}} = a6 + a7(X/l)^{\frac{1}{2}} + a8(X/l)$, in which a6, a7 and a8 are constant coefficients, X/l being the reduced abscissa along the chord of the section, counted from the leading edge, of any point of this second portion.

In a preferred embodiment, these constant coefficients a6, a7 and a8 have the following respective values:
a6 = +0.72957.10
a7 = −0.31509.10$^2$
a8 = +0.37217.10$^2$ Particularly in the case of the coefficient of lift of adaptation being low (less than 0.3 for example), it is advantageous if said third portion of upper surface comprises a point of inversion of curvature, of which the reduced abscissa along the chord of the section, counted from the leading edge, is included between 45% and 85%. The reduced abscissa of said point of inversion of curvature, along the chord of said section and counted from the leading edge, is then advantageously given by the expression (3) $XE/l = 0.58333 + 0.91667\, Cza - 1.1667\, (Cza)^2$ in which Cza is the value of the coefficient of lift of adaptation.

The reduced abscissa of the point of zero curvature of said second portion of upper surface is preferably given by the formula (4)
$$X/l = a9(e/l) + a10(e/l)^2 + a11(e/l)^3 + a12(e/l)^4 + a13(e/l)^5$$

in which e/l is the maximum relative thickness of the section (1) and a9, a10, a11, a12 and a13 are constant coefficients. These latter constant coefficients advantageously present the following respective values:
a9 = −0.39176.10$^3$
a10 = +0.13407.10$^5$
a11 = −0.16845.10$^6$
a12 = +0.92807.10$^6$
a13 = −0.18878.10$^7$ The sections according to the present invention may, in known manner, be produced thanks to a law of variation of thickness, associated with a law of camber along the chord of the sections. In a variant, these sections may be defined, for a given relative maximum thickness and for a value of the coefficient of lift of adaptation, by equations binding the reduced coordinates of the upper surface and of the lower surface.

Examples of these two types of definition are given in the following description.

BRIEF DESCRIPTION OF THE DRAWINGS

The invention will be more readily understood on reading the following description with reference to the accompanying drawings, in which:

FIG. 1 is a schematic general view of a section according to the present invention.

FIGS. 2A, 2B and 2C are diagrams representing, for a section of the invention, the evolution of the coefficient of pressure as a function of the reduced abscissa, respectively on the upper surface in the vicinity of the maximum coefficient of lift (FIG. 2A), on the lower surface in the vicinity of the minimum coefficient of lift for Mach numbers less than 0.5 (FIG. 2B) and on the lower surface in the vicinity of the minimum coefficient of lift for Mach numbers higher than 0.5 (FIG. 2C).

FIG. 7 is a schematic diagram comparing the six sections I to VI of FIGS. 4 to 6 with the NACA 63 A 209 and NACA 16309 sections currently used for making shrouded propellers.

FIG. 11A, relative to section II of the invention, was traced for a Mach number and a coefficient of lift respectively equal to 0.62 and −0.063. FIG. 11B, which concerns the NACA 16 309 section, was traced for the same Mach number equal to 0.62 and for a coefficient of lift equal to −0.052.

FIG. 13 represents the evolution of the coefficient of drag Cx as a function of the coefficient of lift Cz, with a Mach number equal to 0.62, for section II of the invention and for the NACA 16309 section.

FIGS. 14 and 15 illustrate the evolutions of the maximum coefficient of lift as a function of the Mach number, respectively for section IV and for the NACA 63 A 209 section (FIG. 14) and for section II and for the NACA 16309 section (FIG. 15).

DETAILED DESCRIPTION OF THE DRAWINGS

Figure 3:
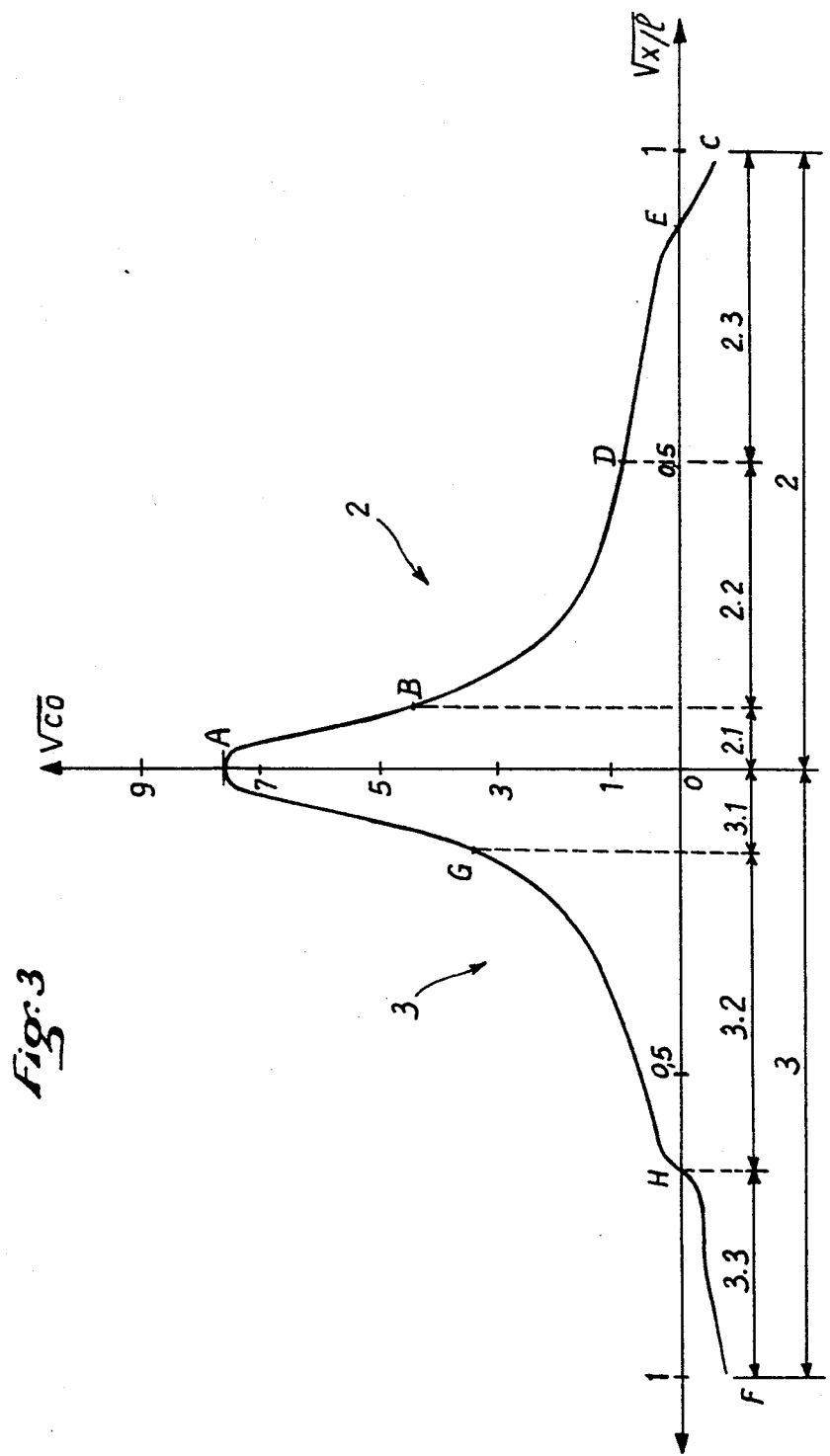
FIG. 3 is a diagram illustrating the evolution of curvature of the upper surface and of the lower surface of a section according to the invention as a function of the reduced abscissa.

Referring now to the drawings, the section 1 according to the invention, shown schematically in FIG. 1, comprises an upper surface line 2 and a lower surface line 3, the upper surface line 2 extending from the leading edge A to the upper edge C of the trailing edge, whilst the lower surface line 3 extends from said leading edge A to the lower edge F of the trailing edge. The segment CF constitutes a leading edge base, of which the thickness is close to 1% of the length l of the chord of the section 1.

FIG. 1 shows a system of orthogonal axes AX, AY, having as origin the leading edge A. Axis AX is merged with the chord of the section 1 and is oriented positively from the leading edge towards the trailing edge. Axis AY is oriented positively from the lower surface 3 towards the upper surface 2. On these axes AX and AY are plotted reduced coordinates, i.e. the abscissa X and the ordinate Y are represented as a function of the length l of the chord of the section 1.

The upper surface line 2, which starts at the leading edge A, comprises:

a first portion 2.1 extending from point A up to a point B located at an abscissa approximately equal to 1% of the length l of said chord;

a second portion 2.2 extending from point B up to a point D located at an abscissa approximately equal to 25% of the length l of said chord; and a third portion 2.3 extending from point D up to point C of the trailing edge, this portion 2.3 being able to comprise a point E located between 45% and 85% of the length l of the chord and at which the curvature of the upper surface is cancelled.

Furthermore, the lower surface line 3, which also starts at the leading edge A, comprises:

a first portion 3.1 extending from point A up to a point G located at an abscissa approximately equal to 2% of the length l of said chord;

a second portion 3.2 extending from point G up to a point H, located at an abscissa included between 30% and 70% of said chord and at which the curvature is cancelled; and a third portion 3.3 extending from point H up to point F of the trailing edge.

The section 1 of FIG. 1 has a relative thickness, i.e. with respect to length l of the chord, included between 9% and 15%.

The curvature CO of the section 1 is maximum at the leading edge A. If this maximum curvature at the leading edge is called COA and if this curvature is represented as a function of the length l of the chord, according to a particular feature of the invention, the maximum curvature COA is given by the formula $$COA = \frac{1}{RA} \, a1(e/l) + a2(e/l)^2 + a3(e/l)^3 + a4(e/l)^4 + a5(e/l)^5 \quad (1)$$

expression in which $e/l$ = maximum relative thickness of the section 1, $l$ = length of the chord, RA = radius of curvature at the leading edge A, this radius RA being minimum at that point, $a1, a2, a3, a4$ and $a5$ being constant coefficients.

In an advantageous embodiment, these constant coefficients have respectively the following values:

$a1 = -0.2936 \cdot 10^6$ $a2 = +0.99839 \cdot 10^7$ $a3 = -0.12551 \cdot 10^9$ $a4 = +0.69412 \cdot 10^9$ $a5 = -0.14276 \cdot 10^{10}$ In said first portion 2.1 of the upper surface line 2, the curvature rapidly decreases from this maximum value COA at the leading edge A to a value close to 20 at point B (abscissa of the order of 1%). Then, in the second portion 2.2 of the upper surface line 2, the curvature decreases much more slowly from the value approximately equal to 20 at point B down to a value close to 1 at point D (abscissa of the order of 25%).

The evolution of the curvature CO along this second portion 2.2 of upper surface line is advantageously in accordance with formula $$(2) \quad CO^{\frac{1}{2}} = a6 + a7(X/1)^{\frac{1}{2}} + a8(X/1),$$

in which a6, a7 and a8 are constant coefficients. In one embodiment, these coefficients have the following values:

a6 = +0.72957.10
a7 = −0.31509.10$^2$
a8 = +0.37217.10$^2$

In the third portion 2.3 of the upper surface line 2, the curvature CO is less than 1 between points D and C. In particular for the low values of the coefficient of lift of adaptation Cza (Cza<0.3), this third portion of upper surface 2.3 may comprise an inversion of curvature at point E. In that case, the reduced abscissa XE/1 of the point of inversion of curvature E is given for example by the expression $$(3) \quad XE/1 = 0.58333 + 0.91667\, Cza - 1.1667\, (Cza)^2$$

In all cases, XE/1 is included between 45% and 85% of the length of the chord 1.

The particular distribution, described hereinabove, of the curvatures at the upper surface 2 of the sections of the family according to the invention in the three portions 2.1, 2.2 and 2.3 previously defined, makes it possible to obtain, conjointly, very low values of drag at the coefficient of lift of adaptation and noteworthy values of the maximum coefficient of lift.

In this way, the evolution of the curvatures in the first portion 2.1 of upper surface makes it possible to limit overspeeds in the vicinity of the leading edge A, for lifts greater than the lift of adaptation, whilst the evolutions of curvature in the second portion 2.2 avoid the formation of intense shock for a wide range of coefficients of lift beyond the coefficient of lift of adaptation and consequently make it possible to obtain a wide range of coefficients of lift with low coefficient of drag Cx. The evolution of the curvatures in the third portion 2.3 of upper surface allows a noteworthy control of the recompressions in this zone, particularly for the low values of the Reynolds number of use thus limiting the thickening of the boundary layer and delaying the appearance of separation. Moreover, this evolution of the curvatures leads to a rise of the point of separation towards the leading edge, which is not very rapid with the angle of attack, which ensures for the section a range of usable angles of attack extended beyond the angle of attack of adaptation.

Furthermore, according to other features of the sections according to the present invention:

in the first portion 3.1 of lower surface, the curvature decreases from the maximum value COA at the leading edge A up to a value close to 11 at point G;

in the second portion 3.2 of lower surface, the reduced abscissa of the point of zero curvature is given by the formula $$(4) \quad X/1 = a9(e/1) + a10(e/1)^2 + a11(e/1)^3 + a12(e/1)^4 + a13(e/1)^5$$

with
a9 = −0.39176.10$^3$
a10 = +0.13407.10$^5$
a11 = −0.16845.10$^6$
a12 = +0.92807.10$^6$
a13 = −0.18878.10$^7$ in the third portion 3.3 of lower surface, the curvature remains negative and less in absolute value than 1.

Thanks to such variations of curvature at the lower surface, the section according to the invention presents very good performances for values of the coefficient of lift less than the coefficient of lift of adaptation, i.e. low levels of drag and low values of the minimum coefficient of lift. In fact, the evolution of curvature in the first portion of lower surface 3.1 makes it possible to limit the overspeeds in the vicinity of the leading edge, whilst the evolution of curvature in the second portion 3.2 makes it possible, for the Mach numbers of adaptation less than 0.5, to obtain progressive recompressions of the flow avoiding separation of the boundary layer for low values of the coefficient of lift and avoids, under the same conditions, for Mach numbers of adaptation higher than 0.5, the formation of intense shock wave. It is recalled that the Mach number of adaptation is the Mach number at which a section must work and for which it is defined. As for the upper surface, the third portion of lower surface 3.3 makes it possible, for the low Reynolds numbers of use, to avoid the appearance of a separation of trailing edge for a wide range of values of coefficient of lift less than the coefficient of adaptation. In this way, the sections according to the invention present noteworthy values of the minimum coefficient of lift and the range of the coefficients of lift of good functioning this side of the coefficient of lift of adaptation is high.

These performances, particularly at the maximum and minimum coefficients of lift, are illustrated in FIGS. 2A, 2B and 2C which show that the sections according to the invention present characteristic distributions of pressures in the vicinity of the values Cz max and Cz mini of the coefficient of lift.

In the vicinity of Cz max and for a Mach number of average functioning, the distribution of the coefficient of pressure Cp at the upper surface of the sections according to the invention present the particular pattern shown in FIG. 2A.

For an upstream infinite Mach number of 0.55, there exists, at the upper surface of the sections, a regular rise of the line of overspeed up to a value of the coefficient of pressure close to −2.5. This rise is followed by a short level portion terminating in a shock of moderate intensity, located before 20% of the chord of the sections. The intensity of this shock remains moderate taking into account the high levels of coefficient of lift which are attained. The line of recompression which follows the shock is a regular and concave line whose concavity decreases progressively towards the trailing edge. The appropriate evolution of this line of recompression limits the thickening of the boundary layer and delays the appearance of the separation, particularly at low Reynolds numbers.

For the levels of coefficient of lift clearly less than the coefficient of lift of adaptation and close to Cz mini, the distributions of pressure presented by the sections according to the invention are divided into two characteristic types depending on whether the operational Mach number is greater or less than 0.5. These two characteristic types of flow are shown respectively in FIGS. 2B and 2C.

For the operational Mach numbers less than 0.5 (cf. FIG. 2B), there exists at the lower surface of the sections according to the invention a rapid rise of the line of overspeed. The level of this overspeed remains moderate for these low values of coefficient of lift. This overspeed is followed by a regular and concave line of recompression up to the trailing edge, which avoids separation of the boundary layer and therefore makes it possible to attain noteworthy values for Cz mini.

For the operational Mach numbers greater than 0.5 (cf. FIG. 2C), the flow at the lower surface of the sections according to the invention is characterized in the vicinity of the Cz mini by a zone of overspeed of reduced intensity, limited by a shock located at about 10% from the chord of the sections. The intensity of the shock remains moderate even at low values of coefficients of lift attained. The line of recompression which follows the shock is regular and concave; it leads to slight pressure gradients in the vicinity of the trailing edge which make it possible to avoid precocious separation of the boundary layer at low Reynolds numbers.

These advantageous flow characteristics, enabling the very good performances envisaged to be obtained, are due to the geometrical specifications of the sections according to the invention established hereinabove and in particular to the evolutions of curvature recommended.

FIG. 3 illustrates the evolutions of curvature at the upper surface and at the lower surface of an example of section according to the invention. For reasons of clarity, the evolutions of the square root of the curvature CO have been plotted as a function of the square root of the reduced abscissa X/1 and the lower surface of the section has been plotted from 0 to −1.

As shown in FIG. 3, the curvature at the upper surface 2 is maximum at the leading edge A. In the portion of upper surface 2.1 which extends from the leading edge A to point B located at about 1% from the chord, the curvature decreases to a value equal to about 20. This first portion 2.1 is followed by a second 2.2 extending from point B to point D located at about 25% from the chord, in which the curvature decreases to a value equal to 1. This second portion 2.2 is followed by the third portion of upper surface 2.3, in which the curvature remains in absolute value less than 1. This portion 2.3 may comprise a point of inversion of curvature E for the sections of the invention whose coefficients of lift of adaptation are less than 0.3.

Similarly, FIG. 3 illustrates that the curvature at the lower surface 3, maximum at the leading edge A, decreases rapidly in the first portion 3.1 to a value about equal to 11 at point G located approximately at a distance equal to 2% from the chord from point A. This first portion 3.1 is followed by the second 3.2 extending from point G to point H located between 30 and 70% from the chord and in which the curvature decreases from value 11 at point G to a zero value at point H.

This second portion 3.2 is followed by a third portion 3.3 extending from point H defined hereinbefore up to the trailing edge F and in which the curvature remains in absolute value less than 1.

In order to define and easily create a section of the family according to the invention, a law of variation of thickness and a law of variation of camber along the chord of the section may be employed, in accordance with the technique defined on page 112 of the Report "Theory of wing sections" by H. ABOTT and E. VON DOENHOFF published in 1949 by the McGRAW HILL BOOK Company, Inc.

According to this technique, the coordinates of a section are obtained by plotting on either side of the median line and perpendicularly thereto, the half-thickness at that point.

To that end, the following analytic formulae are advantageously used for the median line and the law of thickness:

for the median line:

(5)
$$Y/1 = c1(X/1) + c2(X/1)^2 + c3(X/1)^3 + c4(X/1)^4 + c5(X/1)^5 + c6(X/1)^6 + c7(X/1)^7$$

for the law of thickness:

(6) $$Ye/1 = b1(X/1) + b2(X/1)^2 + b3(X/1)^3 + b4(X/1)^4 + b5(X/1)^5 + b6(X/1)^6 + b7(X/1)^7 + b8(X/1)^8 + b9(X/1)^9 + b10(X/1)^{10}$$

For the sections according to the invention, of which the relative thickness is included between 9% and 15%, each coefficient $b1$ to $b10$ of formula (6) may advantageously be defined by the corresponding formula (7.1) to (7.10) given hereinafter:

(7.1) $b1 = b11(e/1) + b12(e/1)^2 + b13(e/1)^3 + b14(e/1)^4 + b15(e/1)^5 + b16(e/1)^6$ (7.2) $b2 = b21(e/1) + b22(e/1)^2 + b23(e/1)^3 + b24(e/1)^4 b25(e/1)^5 + b26(e/1)^6$ (7.10) $b10 = b101(e/1) + b102(e/1)^2 + b103(e/1)^3 I\ b104(e/1)^4 + b105(e/1)^5 + b106(e/1)^6$

The different coefficients $b11$ to $b106$ then have the following values:

| | |
|---|---|
| $b11 = +0,98542.10^5$ | $b61 = -0,18709.10^{10}$ |
| $b12 = -0,43028.10^7$ | $b62 = +0,82093.10^{11}$ |
| $b13 = +0,74825.10^8$ | $b63 = -0,14340.10^{13}$ |
| $b14 = -0,64769.10^9$ | $b64 = +0,12464.10^{14}$ |
| $b15 = +0,27908.10^{10}$ | $b65 = -0,53912.10^{14}$ |
| $b16 = -0,47889.10^{10}$ | $b66 = +0,92831.10^{14}$ |
| $b21 = -0,33352.10^7$ | $b71 = +0,25348.10^{10}$ |
| $b22 = +0,14610.10^9$ | $b72 = -0,11123.10^{12}$ |
| $b23 = -0,25480.10^{10}$ | $b73 = +0,19432.10^{13}$ |
| $b24 = +0,22115.10^{11}$ | $b74 = -0,16892.10^{14}$ |
| $b25 = -0,95525.10^{11}$ | $b75 = +0,73066.10^{14}$ |
| $b26 = +0,16428.10^{12}$ | $b76 = -0,12582.10^{15}$ |
| $b31 = +0,39832.10^6$ | $b81 = -0,20869.10^{10}$ |
| $b32 = -0,17465.10^{10}$ | $b82 = +0,91583.10^{11}$ |
| $b33 = +0,30488.10^{11}$ | $b83 = -0,16000.10^{13}$ |
| $b34 = -0,26484.10^{12}$ | $b84 = +0,13909.10^{14}$ |
| $b35 = +0,11449.10^{13}$ | $b85 = -0,60166.10^{14}$ |
| $b36 = -0,19704.10^{13}$ | $b86 = +0,10361.10^{15}$ |
| $b41 = -0,24305.10^9$ | $b91 = +0,95554.10^9$ |
| $b42 = +0,10661.10^{11}$ | $b92 = -0,41936.10^{11}$ |
| $b43 = -0,18618.10^{12}$ | $b93 = +0,73266.10^{12}$ |
| $b44 = +0,16178.10^{13}$ | $b94 = -0,63693.10^{13}$ |
| $b45 = -0,69957.10^{15}$ | $b95 = +0,27553.10^{14}$ |
| $b46 = +0,12043.10^{14}$ | $b96 = -0,47450.10^{14}$ |
| $b51 = +0,86049.10^9$ | $b101 = -0,18663.10^9$ |
| $b52 = -0,37753.10^{11}$ | $b102 = +0,81909.10^{10}$ |
| $b53 = +0,65939.10^{12}$ | $b103 = -0,14311.10^{12}$ |
| $b54 = -0,57309.10^{13}$ | $b104 = +0,12441.10^{13}$ |
| $b55 = +0,24785.10^{14}$ | $b105 = -0,58321.10^{13}$ |
| $b56 = -0,42674.10^{14}$ | $b106 = +0,92688.10^{13}$ |

Similarly, for maximum relative cambers of median line included between −2% and +5% from the chord, each coefficient $c1$ to $c7$ of formula (5) giving the pattern of the median line may advantageously be defined by the corresponding formula (8.1) to (8.7) given hereinafter:

(8.1) $c1 = c1_1(e/1) + c12(e/1)^2 + c13(e/1)^3 + c14(e/1)^4 + c15(e/1)^5 + c16(e/1)^6$ (8.2) $c2 = c21(e/1) + c22(e/1)^2 + c23(e/1)^3 + c24(e/1)^4 + c25(e/1)^5 + c26(e/1)^6$ (8.7) $c7 = c71(e/1) + c72(e/1)^2 + c73(e/1)^3 + c74(e/1)^4 + c75(e/1)^5 + c76(e/1)^6$

The different coefficients c11 to c76 advantageously present the following values:

| | |
|---|---|
| $c11 = -0.29874.10^1$ | $c51 = -0.18750.10^4$ |
| $c12 = -0.61332.10^2$ | $c52 = +0.72410.10^5$ |
| $c13 = +0.60890.10^5$ | $c53 = +0.90745.10^7$ |
| $c14 = -0.43208.10^6$ | $c54 = -0.54687.10^9$ |
| $c15 = -0.12037.10^9$ | $c55 = +0.58423.10^{10}$ |
| $c16 = +0.24680.10^{10}$ | $c56 = +0.50242.10^{11}$ |
| $c21 = +0.17666.10^2$ | $c61 = +0.12366.10^4$ |
| $c22 = +0.70530.10^4$ | $c62 = -0.43178.10^5$ |
| $c23 = -0.40637.10^6$ | $c63 = -0.61307.10^7$ |
| $c24 = -0.28310.10^8$ | $c64 = +0.33946.10^9$ |
| $c25 = +0.20813.10^{10}$ | $c65 = -0.26651.10^{10}$ |
| $c26 = -0.31463.10^{11}$ | $c66 = -0.49209.10^{11}$ |
| $c31 = -0.38189.10^3$ | $c71 = -0.31247.10^3$ |
| $c32 = +0.31787.10^2$ | $c72 = +0.83939.10^4$ |
| $c33 = +0.23684.10^4$ | $c73 = +0.16280.10^7$ |
| $c34 = -0.47636.10^8$ | $c74 = -0.74431.10^8$ |
| $c35 = -0.26705.10^{10}$ | $c75 = +0.30520.10^8$ |
| $c36 = +0.65378.10^{11}$ | $c76 = +0.21265.10^{11}$ |
| $c41 = +0.13180.10^4$ | |
| $c42 = -0.44650.10^5$ | |
| $c43 = -0.65945.10^7$ | |
| $c44 = +0.35822.10^9$ | |
| $c45 = -0.24986.10^{10}$ | |
| $c46 = -0.58675.10^{11}$ | |

The above analytic formulae make it possible to restore the numerous particular geometrical characteristics of the sections according to the invention. They also make it possible, once the evolution of the law of thickness has been chosen as a function of the span of the blade, law which is chosen by considerations of structural resistance, to define the geometry of the complete blade, the evolution of the maximum camber with the span being defined according to the application envisaged.

Figure 4:
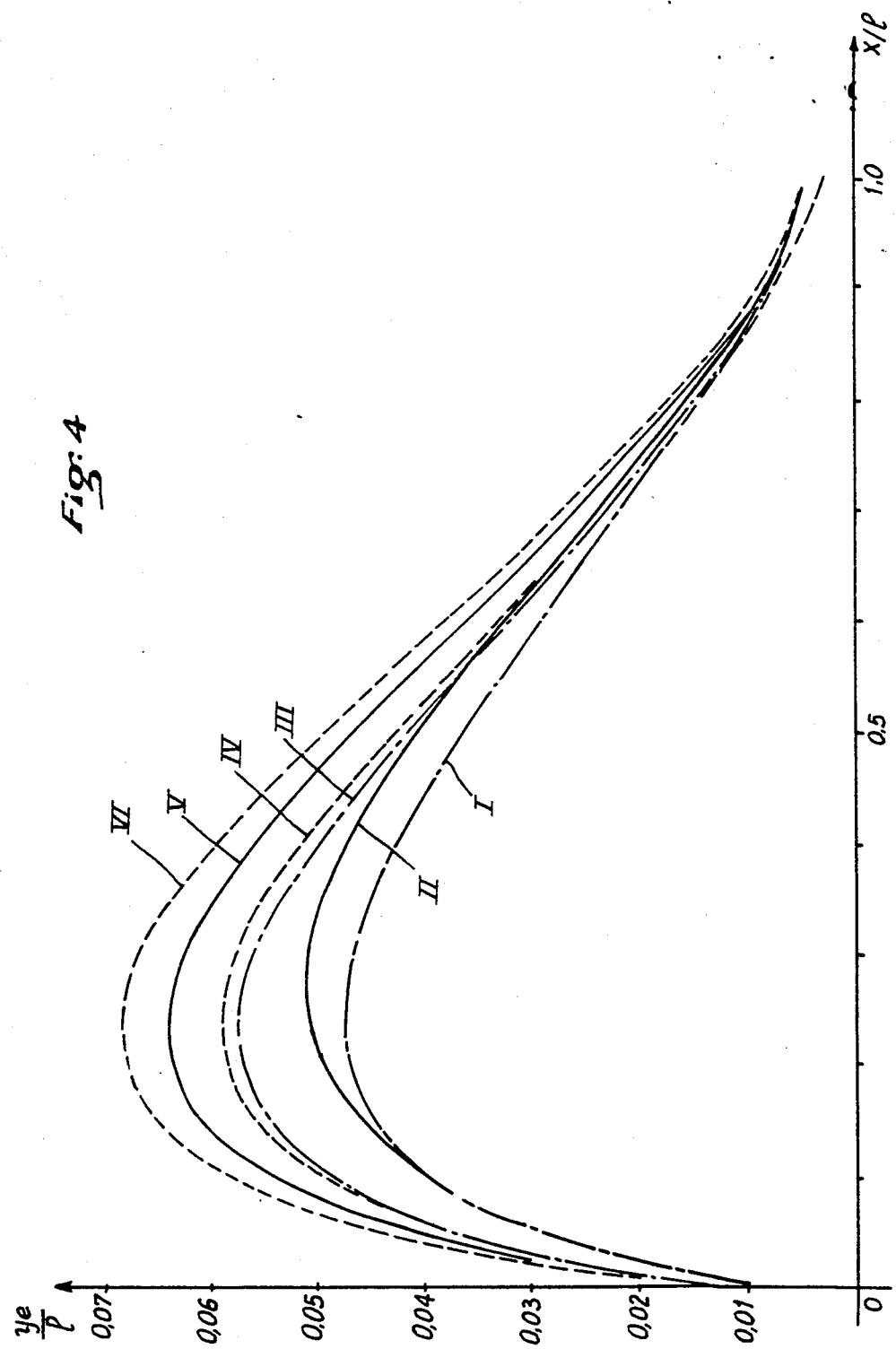
FIG. 4 is a diagram illustrating the variation, as a function of the reduced abscissa, of the relative thickness of six examples of sections according to the present invention, respectively referenced I to VI and presenting respective relative thicknesses of 9.5%, 10.2%, 11.7%, 12%, 12.8% and 13.9%.
Figure 5:
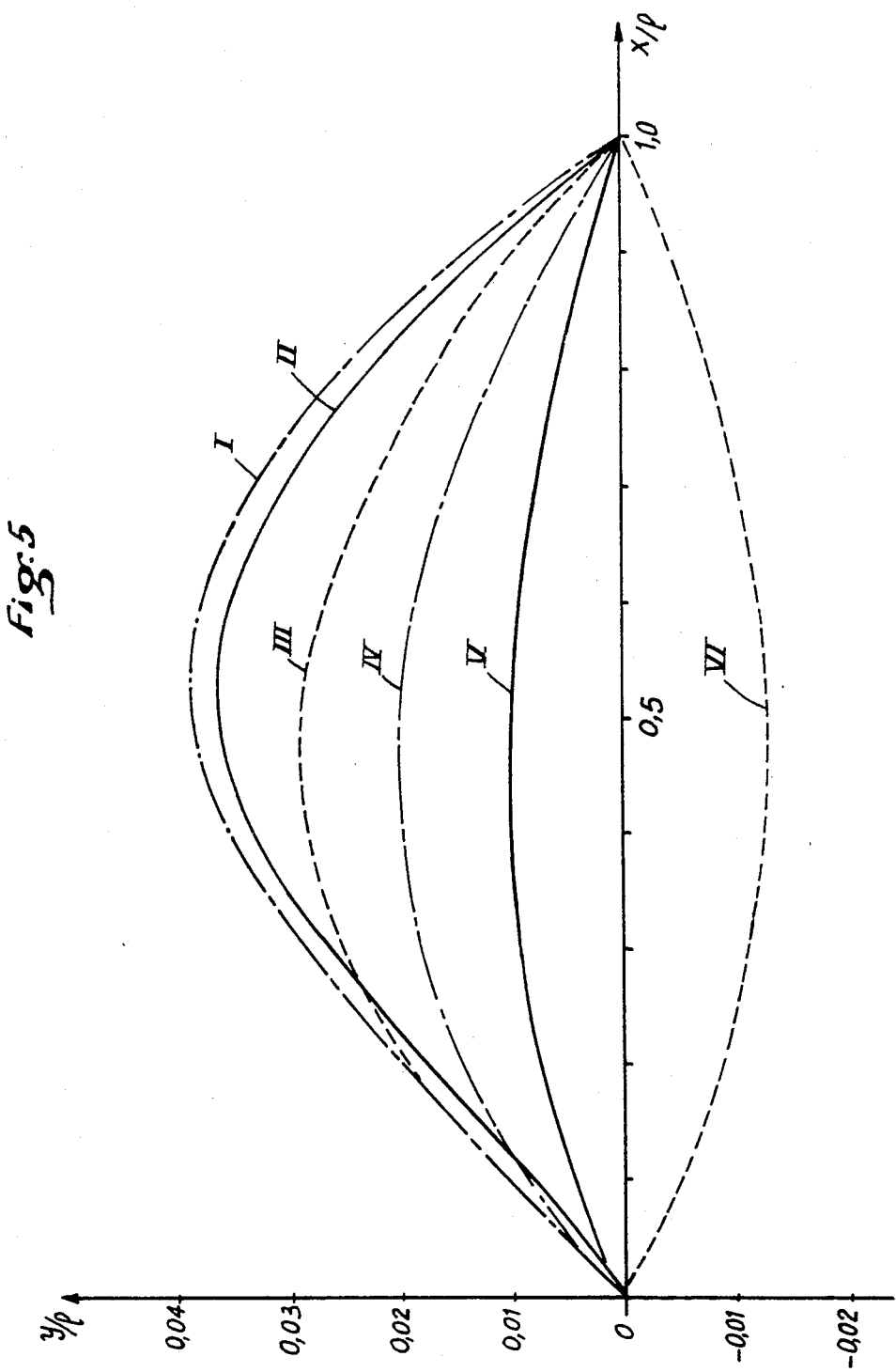
FIG. 5 is a diagram in which are traced the median lines of sections I to VI of FIG. 4, presenting relative maximum cambers respectively equal to 3.8%, 3.6%, 2.9%, 2%, 1% and −1.3%.

By way of example, FIG. 4 shows the laws of thickness of six sections according to the invention, respectively referenced I to VI, having respectively maximum relative thicknesses of 9.5%, 10.2%, 11.7%, 12%, 12.8% and 13.9%. In FIG. 5, likewise by way of example, the median lines of sections I to VI defined hereinabove have been plotted, respectively for maximum cambers equal to +3.8%, +3.6%, +2.9%, +2%, +1% and −1.3%.

The maximum relative camber Kmax of the median line of the sections according to the invention is advantageously determined, as a function of the value of the coefficient of lift of adaptation Cza, by the following formula:

(9) $Kmax = d1(Cza) + d2(Cza)^2 + d3(Cza)^3 + d4(Cza)^4 + d5(Cza)^5 + d6(Cza)^6$ in which d1 to d6 are constant coefficients.

In an advantageous embodiment, the constant coefficients d1 to d6 have the following values:
d1 = +0.11017
d2 = −0.30167
d3 = −0.58541
d4 = +0.39240.10
d5 = −0.53223.10
d6 = +0.22132.10

In this way, by plotting on either side of the median line (given in FIG. 5) the law of thicknesses (given in FIG. 4), the upper surface and the lower surface of a section according to the invention may be traced.

However, the sections according to the present invention may be defined by equations giving, in the system of rectangular axes AX, AY, the reduced ordinates Y/1 as a function of the reduced abscissa X/1. Several Examples are given hereinafter, corresponding respectively to sections I to VI defined hereinabove.

EXAMPLE I

Section I having a maximum relative thickness equal to 9.5%, for a coefficient of lift of adaptation equal to 1.

In this case, section I is such that:

the reduced ordinates of the line of upper surface are given between X/1=0 and X/1=0.39433, by the formula

(10) $Y/1 = f1(X/1)^{\frac{1}{2}} + f2(X/1) + f3(X/1)^2 + f4(X/1)^3 + f5(X/1)^4 + f6(X/1)^5 + f7(X/1)^6$ with
f1 = +0.16227
f2 = −0.11704.10⁻¹
f3 = +0.13247
f4 = −0.25016.10
f5 = +0.10682.10²
f6 = −0.22210.10²
f7 = +0.17726.10² between X/1=0.39433 and X/1=1, by the formula

(11) $Y/1 = g0 + g1(X/1) + g2(X/1)^2 + g3(X/1)^3 + g4(X/1)^4 + g5(X/1)^5 + g6(X/1)^6$ with
g0 = +0.22968
g1 = −0.17403.10
g2 = +0.77952.10
g3 = −0.17457.10²
g4 = +0.20845.10²
g5 = −0.13004.10²
g6 = +0.33371.10 whilst the reduced ordinates of the line of lower surface of said section are given between X/1=0 and X/1=0.11862, by the formula

(12) $Y/1 = h1(X/1)^{\frac{1}{2}} + h2(X/1) + h3(X/1)^2 + h4(X/1)^3 + h5(X/1)^4 + h6(X/1)^5 + h7(X/1)^6$ with
h1 = −0.13971
h2 = +0.10480.10⁻³
h3 = +0.51698.10
h4 = −0.11297.10³
h5 = +0.14695.10⁴
h6 = −0.96403.10⁴
h7 = +0.24769.10⁵ between X/1=0.11862 and X/1=1, by the formula

(13) $Y/1 = i0 + i1(X/1) + i2(X/1)^2 + i3(X/1)^3 + i4(X/1)^4 + i5(X/1)^5 + i6(X/1)^6$ with
i0 = −0.25915.10⁻¹
i1 = −0.96597.10⁻¹
i2 = +0.49503
i3 = +0.60418.10⁻¹
i4 = −0.17206.10
i5 = +0.20619.10
i6 = −0.77922

EXAMPLE II

Section II having a maximum relative thickness equal to 10.2%, for a coefficient of lift of adaptation equal to 0.9

For this section II:
the reduced ordinates of the lines of upper surface are given
between $X/1=0$ and $X/1=0.39503$, by the formula $$(14) \quad Y/1 = j1(X/1)^{\frac{1}{2}} + j2(X/1) + j3(X/1)^2 + j4(X/1)^3 + j5(X/1)^4 + j6(X/1)^5 + j7(X/1)^6$$

with
  $j1 = +0.14683$
  $j2 = -0.67115.10^{-2}$
  $j3 = +0.44720$
  $j4 = -0.36828.10$
  $j5 = +0.12651.10^2$
  $j6 = -0.23835.10^2$
  $j7 = +0.18155.10^2$
between $X/1=0.39503$ and $X/1=1$, by the formula $$(15) \quad Y/1 = k0 + k1(X/1) + k2(X/1)^2 + k3(X/1)^3 + k4(X/1)^4 + k5(X/1)^5 + k6(X/1)^6$$

with
  $k0 = +0.45955$
  $k1 = -0.39834.10$
  $k2 = +0.16726.10^2$
  $k3 = -0.35737.10^2$
  $k4 = +0.41088.10^2$
  $k5 = -0.24557.10^2$
  $k6 = +0.60088.10$
whilst the reduced ordinates of the line of lower surface of said section are given
between $X/1=0$ and $X/1=0.14473$, by the formula $$(16) \quad Y/1 = m1(X/1)^{\frac{1}{2}} + m2(X/1) + m3(X/1)^2 + m4(X/1)^3 + m5(X/1)^4 + m6(X/1)^5 + m7(X/1)^6$$

with
  $m1 = -0.13297$
  $m2 = +0.36163.10^{-1}$
  $m3 = +0.17284.10$
  $m4 = -0.27664.10^2$
  $m5 = +0.30633.10^3$
  $m6 = -0.16978.10^4$
  $m7 = +0.36477.10^4$
between $X/1=0.14473$ and $X/1=1$, by the formula $$(17) \quad Y/1 = n0 + n1(X/1) + n2(X/1)^2 + n3(X/1)^3 + n4(X/1)^4 + n5(X/1)^5 + n6(X/1)^6$$

with
  $n0 = -0.30824.10^{-1}$
  $n1 = -0.20564.10^{-1}$
  $n2 = -0.21738$
  $n3 = +0.24105.10$
  $n4 = -0.53752.10$
  $n5 = +0.48110.10$
  $n6 = -0.15826.10$

EXAMPLE III

Section III having a maximum relative thickness equal to 11.7%, for a coefficient of lift of adaptation equal to 0.5

For this section III,
the reduced ordinates of the line of upper surface are given
between $X/1=0$ and $X/1=0.28515$, by the formula $$(18) \quad Y/1 = t1(X/1)^{\frac{1}{2}} + t2(X/1) + t3(X/1)^2 + t4(X/1)^3 + t5(X/1)^4 + t6(X/1)^5 + t7(X/1)^6$$

with
  $t1 = +0.21599$
  $t2 = -0.17294$
  $t3 = +0.22044.10$
  $t4 = -0.26595.10^2$
  $t5 = +0.14642.10^3$
  $t6 = -0.39764.10^3$
  $t7 = +0.42259.10^3$
between $X/1=0.28515$ and $X/1=1$, by the formula $$(19) \quad Y/1 = u0 + u1(X/1) + u2(X/1)^2 + u3(X/1)^3 + u4(X/1)^4 + u5(X/1)^5 + u6(X/1)^6$$

with
  $u0 = +0.39521.10^{-1}$
  $u1 = +0.26170$
  $u2 = -0.47274$
  $u3 = -0.40872$
  $u4 = +0.15968.10$
  $u5 = -0.15222.10$
  $u6 = +0.51057$
whilst the reduced ordinates of the line of lower surface of said section are given
between $X/1=0$ and $X/1=0.17428$, by the formula $$(20) \quad Y/1 = v1(X/1)^{\frac{1}{2}} + v2(X/1) + v3(X/1)^2 + v4(X/1)^3 + v5(X/1)^4 + v6(X/1)^5 + v7(X/1)^6$$

with
  $v1 = -0.16526$
  $v2 = -0.31162.10^{-1}$
  $v3 = +0.57567.10$
  $v4 = -0.10148.10^3$
  $v5 = +0.95843.10^3$
  $v6 = -0.44161.10^4$
  $v7 = +0.78519.10^4$
between $X/1=0.17428$ and $X/1=1$, by the formula $$(21) \quad Y/1 = w0 + w1(X/1) + w2(X/1)^2 + w3(X/1)^3 + w4(X/1)^4 + w5(X/1)^5 + w6(X/1)^6$$

with
  $w0 = -0.25152.10^{-1}$
  $w1 = -0.22525$
  $w2 = -0.89038$
  $w3 = -0.10131.10$
  $w4 = +0.16240$
  $w5 = +0.46968$
  $w6 = -0.26400$

EXAMPLE IV

Section IV having a maximum relative thickness equal to 12%, for a coefficient of lift of adapation equal to 0.6

For this section IV,
the reduced ordinates of the line of upper surface are given
between $X/1=0$ and $X/1=0.29461$, by the formula $$(22) \quad Y/1 = p1(X/1)^{178} + p2(X/1) + p3(X/1)^2 + p4(X/1)^3 + p5(X/1)^4 + p6(X/1)^5 + p7(X/1)^6$$

with
  $p1 = +0.16347$
  $p2 = +0.20845$
  $p3 = -0.20506.10$
  $p4 = +0.13223.10^2$
  $p5 = -0.63791.10^2$
  $p6 = +0.16200.10^3$
  $p7 = -0.16302.10^3$
between $X/1=0.29461$ and $X/1=1$, by the formula

(23) $Y/1 = q0 + q1(X/1) + q2(X/1)^2 + q3(X/1)^3 + q4(X/1)^4 + q5(X/1)^5 + q6(X/1)^6$ with
$q0 = +0.54860.10^{-1}$
$q1 = +0.13872$
$q2 = +0.16460$
$q3 = -0.17424.10$
$q4 = +0.28085.10$
$q5 = -0.19062.10$
$q6 = +0.48442$ whilst the reduced ordinates of the line of lower surface of said section are given
between $X/1 = 0$ and $X/1 = 0.14931$, by the formula

(24) $Y/1 = r1(X/1)^{\frac{1}{2}} + r2(X/1) + r3(X/1)^2 + r4(X/1)^3 + r5(X/1)^4 + r6(X/1)^5 + r7(X/1)^6$ with
$r1 = 0.19086$
$r2 = +0.29842$
$r3 = -0.51359.10$
$r4 = +0.11144.10^3$
$r5 = -0.11385.10^4$
$r6 = +0.56797.10^4$
$r7 = -0.11091.10^5$ between $X/1 = 0.14931$ and $X/1 = 1$, by the formula

(25) $Y/1 = s0 + s1(X/1) + s2(X/1)^2 + s3(X/1)^3 + s4(X/1)^4 + s5(X/1)^5 + s6(X/1)^6$ with
$s0 = -0.31248.10^{-1}$
$s1 = -0.12350$
$s2 = +0.42720$
$s3 = +0.32923$
$s4 = -0.19650.10$
$s5 = +0.21099.10$
$s6 = -0.74935$

EXAMPLE V

Section V having a maximum relative thickness equal to 12.8% for a coefficient of lift of adaptation equal to 0.2

For this section V,
the reduced ordinates of the line of upper surface are given
between $X/1 = 0$ and $X/1 = 0.26861$, by the formula

(26) $Y/1 = \alpha1(X/1)^{178} + \alpha2(X/1) + \alpha3(X/1)^2 + \alpha4(X/1)^3 + \alpha5(X/1)^4 + \alpha6(X/1)^5 + \alpha7(X/1)^6$ with
$\alpha1 = +0.19762$
$\alpha2 = +0.17213$
$\alpha3 = -0.53137.10$
$\alpha4 = +0.56025.10^2$
$\alpha5 = -0.32319.10^3$
$\alpha6 = +0.92088.10^3$
$\alpha7 = -0.10229.10^4$ between $X/1 = 0.26861$ and $X/1 = 1$, by the formula

(27) $Y/1 = \beta0 + \beta1(X/1) + \beta2(X/1)^2 + \beta3(X/1)^3 + \beta4(X/1)^4 + \beta5(X/1)^5 + \beta6(X/1)^6$ with
$\beta0 = +0.28900.10^{-1}$
$\beta1 = +0.38869$
$\beta2 = -0.10796.10$
$\beta3 = +0.80848$
$\beta4 = +0.45025$
$\beta5 = -0.10636.10$
$\beta6 = -0.47182$ whilst the reduced ordinates of the line of lower surface of said section are given
between $X/1 = 0$ and $X/1 = 0.20934$, by the formula

(28) $Y/1 = \gamma1(X/1)^{\frac{1}{2}} + \gamma2(X/1) + \gamma3(X/1)^2 + \gamma4(X/1)^3 + \gamma5(X/1)^4 + \gamma6(X/1)^5 + \gamma7(X/1)^6$ with
$\gamma1 = -0.25376$
$\gamma2 = +0.61860$
$\gamma3 = -0.96212.10$
$\gamma4 = +0.12843.10^3$
$\gamma5 = -0.90701.10^3$
$\gamma6 = +0.32291.10^4$
$\gamma7 = -0.45418.10^4$ between $X/1 = 0.20934$ and $X/1 = 1$, by the formula

(29) $Y/1 = \delta0 + \delta1(X/1) + \delta2(X/1)^2 + \delta3(X/1)^3 + \delta4(X/1)^4 + \delta5(X/1)^5 + \delta6(X/1)^6$ with
$\delta0 = -0.25234.10^{-1}$
$\delta1 = -0.32905$
$\delta2 = +0.10890.10$
$\delta3 = -0.10066.10$
$\delta4 = -0.32520$
$\delta5 = +0.11325.10$
$\delta6 = -0.54043$

EXAMPLE VI

Section VI having a maximum relative thickness equal to 13.9%, for a coefficient of lift of adaptation equal to −0.1

For this section VI,
the reduced ordinates of the line of upper surface are given
between $X/1 = 0$ and $X/1 = 0.19606$, by the formula

(30) $Y/1 = \epsilon1(X/1)^{\frac{1}{2}} + \epsilon2(X/1) + \epsilon3(X/1)^2 + \epsilon4(X/1)^3 + \epsilon5(X/1)^4 + \epsilon6(X/1)^5 + \epsilon7(X/1)^6$ with
$\epsilon1 = +0.22917$
$\epsilon2 = -0.22972$
$\epsilon3 = +0.21262.10$
$\epsilon4 = -0.39557.10^2$
$\epsilon5 = +0.32628.10^3$
$\epsilon6 = -0.13077.10^4$
$\epsilon7 = +0.20370.10^4$ between $X/1 = 0.19606$ and $X/1 = 1$, by the formula

(31) $Y/1 = \lambda0 + \lambda1(X/1) + \lambda2(X/1)^2 + \lambda3(X/1)^3 + \lambda4(X/1)^4 + \lambda5(X/1)^5 + \lambda6(X/1)^6$ with
$\lambda0 = +0.32500.10^{-1}$
$\lambda1 = +0.29684$
$\lambda2 = -0.99723$
$\lambda3 = +0.82973$
$\lambda4 = +0.40616$
$\lambda5 = -0.10053.10$
$\lambda6 = +0.44222$ whilst the reduced ordinates of the line of lower surface of said section are given
between $X/1 = 0$ and $X/1 = 0.26478$, by the formula

(32) $Y/1 = \mu1(X/1)^{178} + \mu2(X/1) + \mu3(X/1)^2 + \mu4(X/1)^3 + \mu5(X/1)^4 + \mu6(X/1)^5 + \mu7(X/1)^6$ with
$\mu1 = -0.19314$
$\mu2 = -0.22031$ $\mu3 = +0.41399.10$
$\mu4 = -0.41389.10^2$
$\mu5 = +0.23230.10^3$
$\mu6 = -0.66179.10^3$
$\mu7 = +0.74216.10^3$ between $X/1 = 0.26478$ and $X/1 = 1$, by the formula $$(33)\ Y/1 = \nu0 + \nu1(X/1) + \nu2(X/1)^2 + \nu3(X/1)^3 + \nu4(X/1)^4 + \nu5(X/1)^5 + \nu6(X/1)^6$$

with
$\nu0 = -0.42417.10^{-1}$
$\nu1 = -0.29161$
$\nu2 = +0.57883$
$\nu3 = +0.41309$
$\nu4 = -0.19045.10$
$\nu5 = +0.18776.10$
$\nu6 = -0.63583$ Especially for the particular application to a transverse stabilization rotor for helicopter, the section according to the invention is advantageously used for Mach numbers of adaptation Mad which, as a function of the maximum relative thickness e/1 of said section, vary according to formula $$(34)\ \text{Mad} = \phi0 + \phi1(e/1)$$

with
$\phi0 = -0.88636.10$
$\phi1 = +0.15320.10$

The values of the Mach number of adapation thus obtained are not critical, as the sections according to the invention present very good performances for ranges of Mach numbers around the Mach number of adaptation of about 30%.

Figure 6:
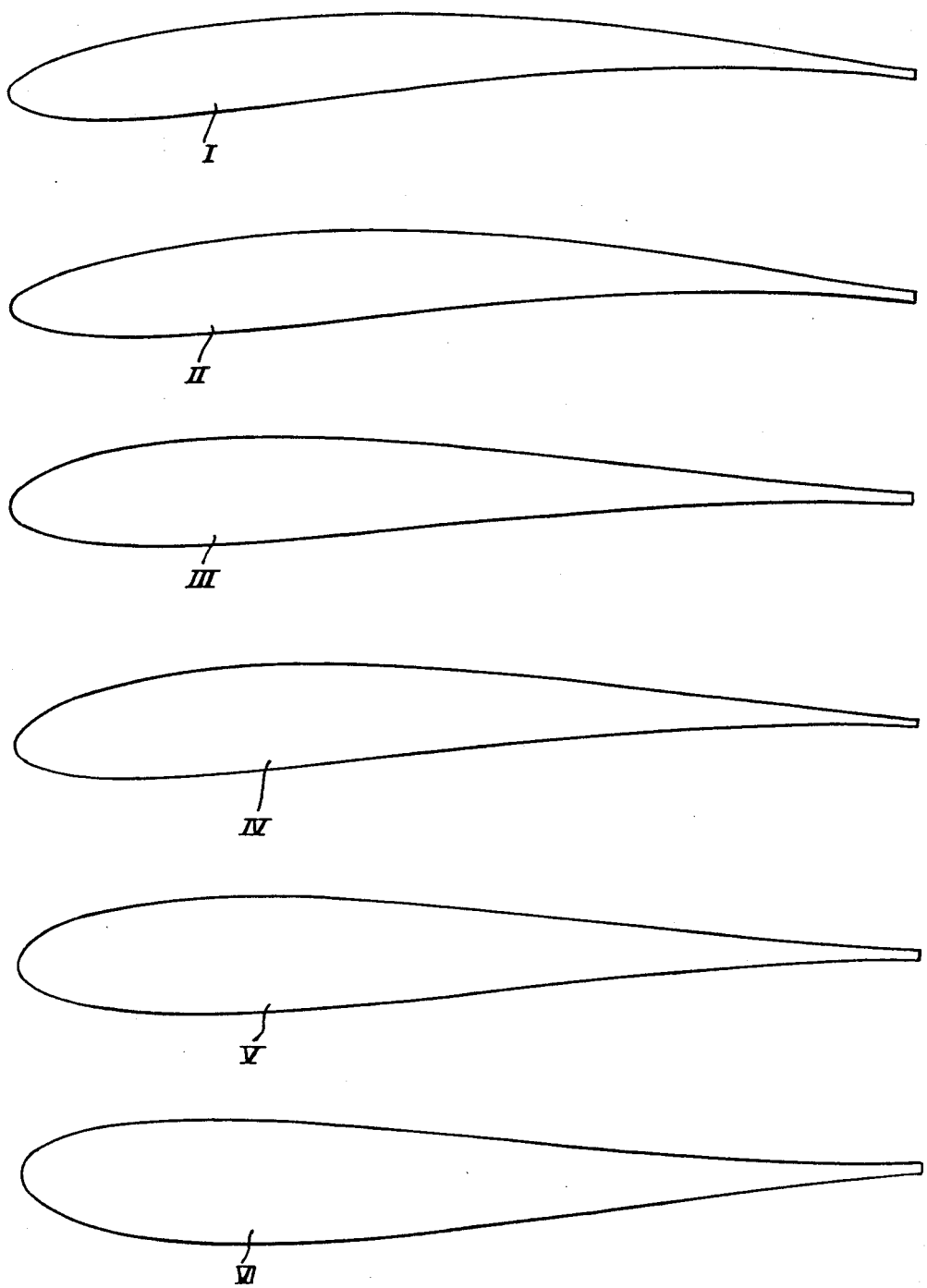
FIG. 6 schematically illustrates the form of sections I to VI of FIGS. 4 and 5.

FIG. 6 schematically shows each of the particular sections I to VI according to the present invention. Moreover, FIG. 7 shows, on a smaller scale, said sections I to VI, as well as the known sections NACA 63 A 209 and NACA 16309, generally used for making shrouded propellers. This FIG. 7 therefore makes it possible to compare sections I to VI of the invention with these two known sections and it shows that the sections of the invention are very different from these latter.

Comparative tests made under the same conditions on sections II and IV according to the invention and the conventional NACA 16309 and NACA 63 A 209 sections have confirmed the excellent performances of the sections according to the invention.

Figure 8A:
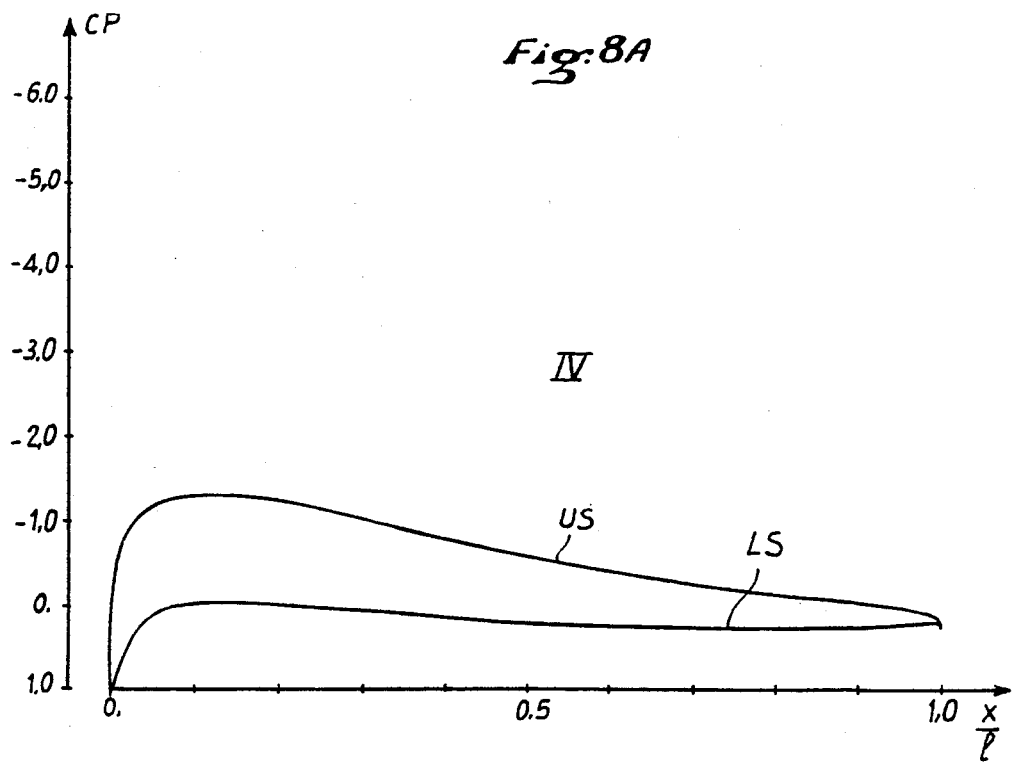
FIGS. 8A and 8B are diagrams respectively illustrating the evolution, as a function of the reduced abscissa, of the coefficient of pressure Cp on the upper surface (curves US) and on the lower surface (curves LS), for the section IV of the invention having a relative thickness of 12% and for the NACA 63 A 209 section. The diagram of FIG. 8A, concerning section IV, was traced for a Mach number equal to 0.5 and for a coefficient of lift equal to 0.773. The diagram of FIG. 8B, relative to the NACA 63 A 209 section, corresponds to the same Mach number equal to 0.5 and to a coefficient of lift equal to 0.768.
Figure 8B:
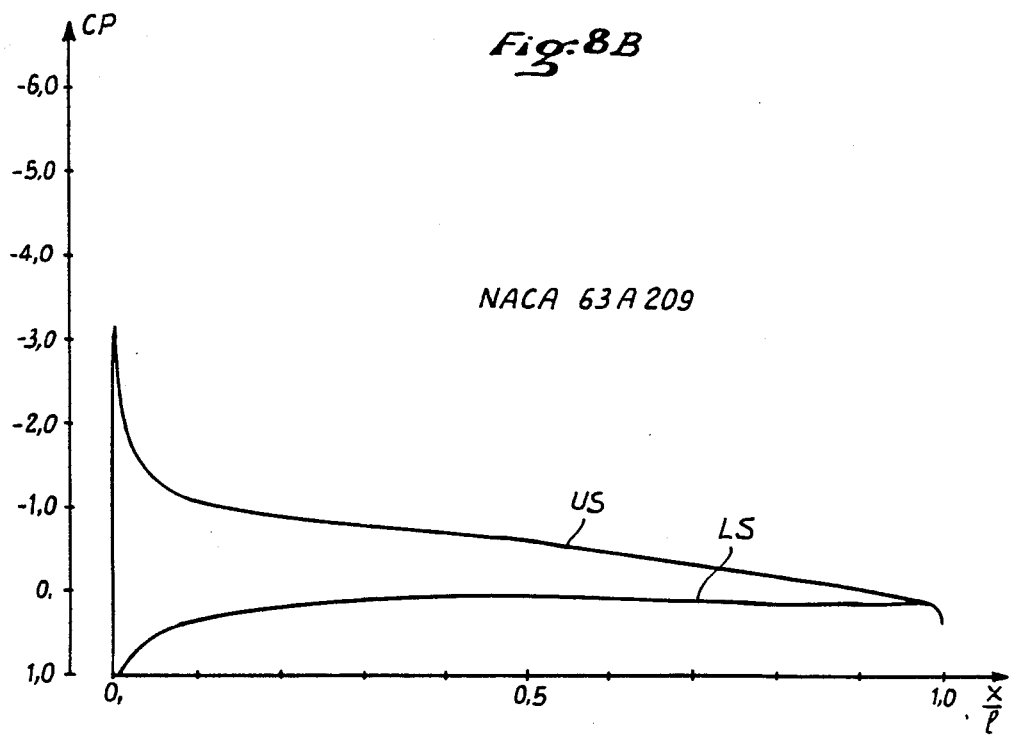

The evolution of the curvatures in region 2.1 of the upper surface of the sections according to the invention makes it possible to reduce in absolute value the minimum coefficient of pressure at the upper surface with respect to the conventional NACA 63 sections, as shown in FIGS. 8A and 8B, under conditions of Mach number and of coefficient of lift representative of those encountered on a shrouded propeller blade.

Figure 9A:
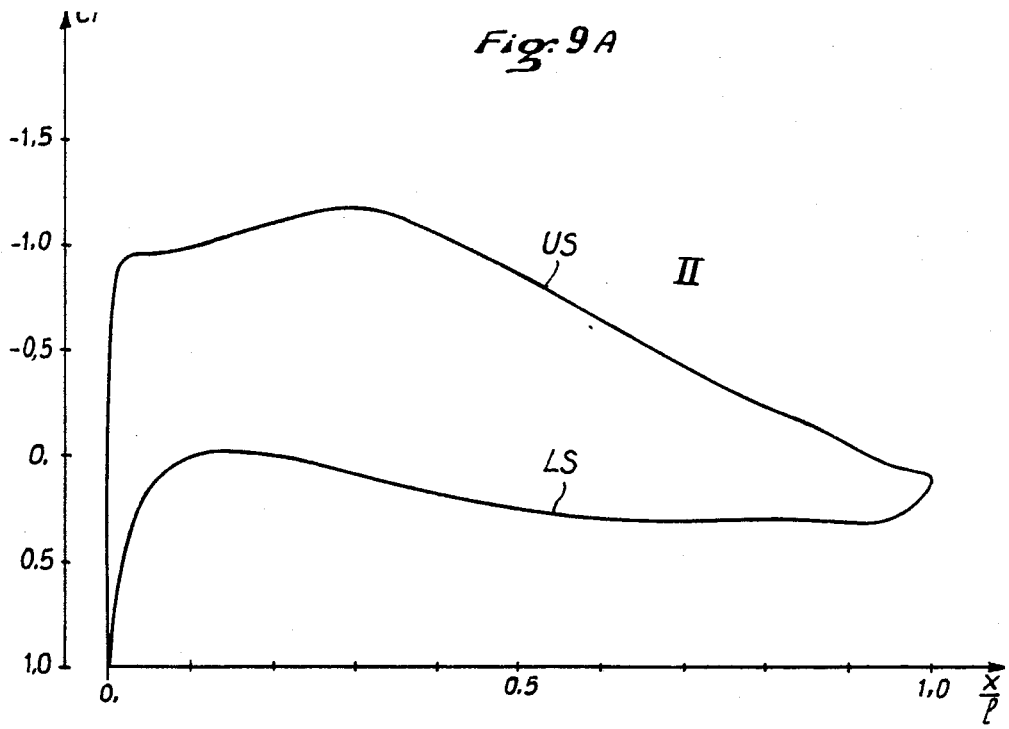
FIGS. 9A and 9B are diagrams respectively illustrating the evolution, as a function of the reduced abscissa, of the coefficient of pressure Cp on the upper surface (curves US) and on the lower surface (curves LS) for the section II of the invention having a relative thickness of 10% and for the NACA 16309 section. The diagram of FIG. 9A, concerning section II, was traced for a Mach number equal to 0.62 and for a coefficient of lift equal to 0.903. The diagram of FIG. 9B, relative to section NACA 16309, corresponds to the same Mach number equal to 0.62 and to a coefficient of lift equal to 0.889.
Figure 9B:
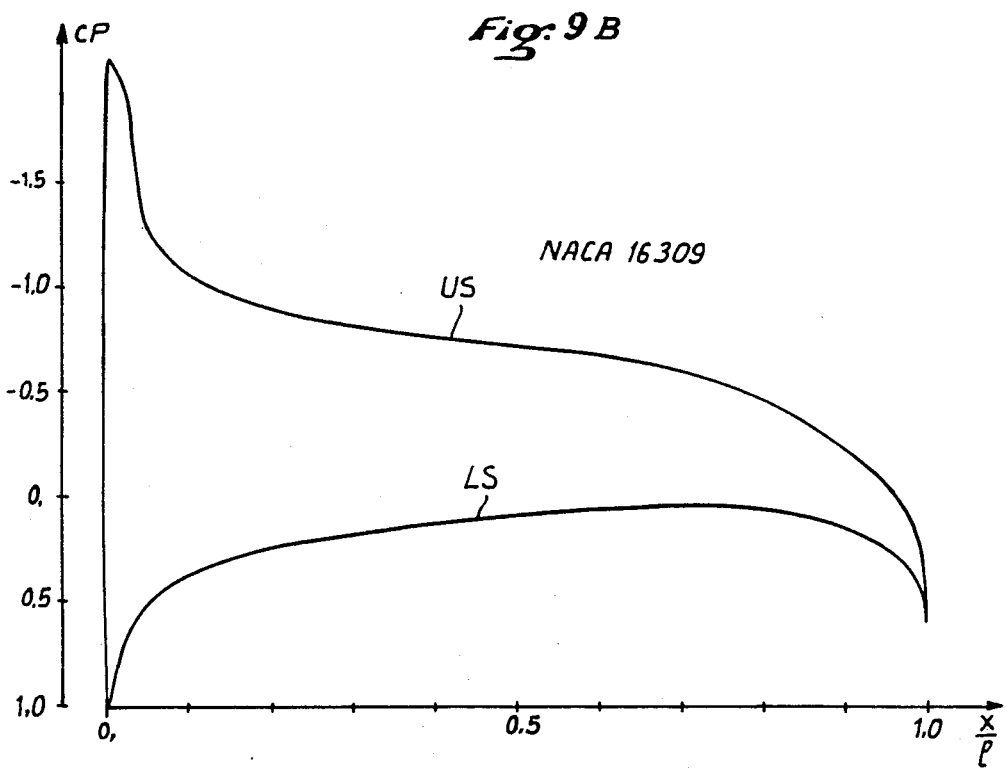
Figure 10A:
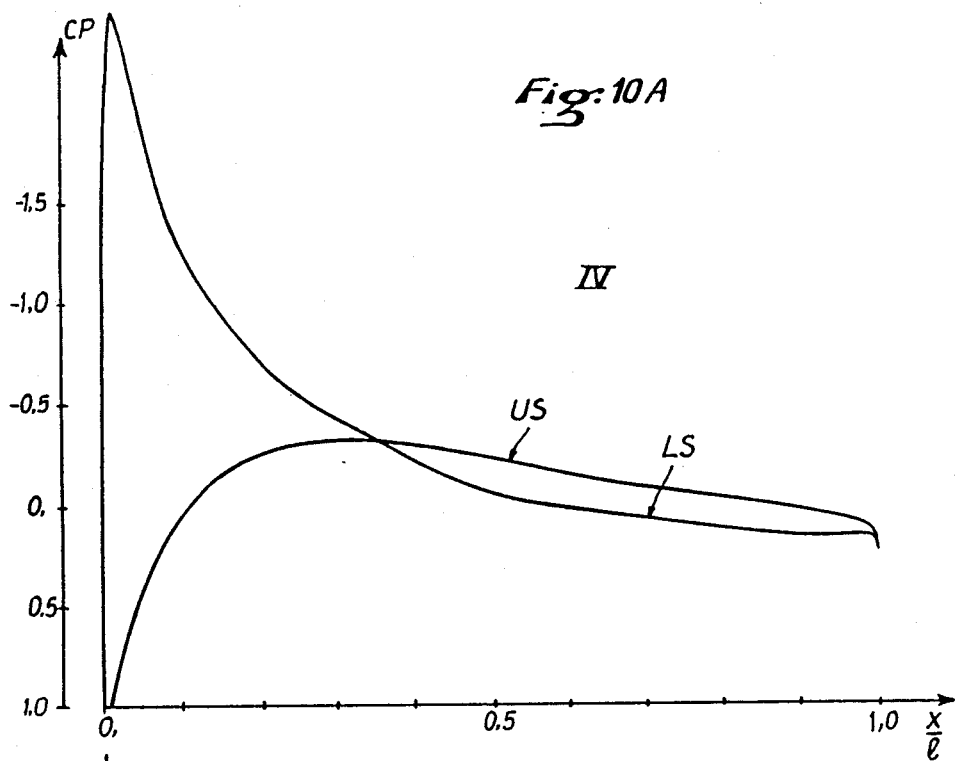
FIGS. 10A and 10B correspond respectively to FIGS. 8A and 8B for low coefficients of lift. The diagram of FIG. 10A, concerning section IV of the invention, was traced for a Mach number equal to 0.5 and for a coefficient of lift equal to −0.259. The diagram of FIG. 10B, which corresponds to the NACA 63 A 209 section, was traced for a Mach number equal to 0.5 and a coefficient of lift equal to −0.252.
Figure 10B:
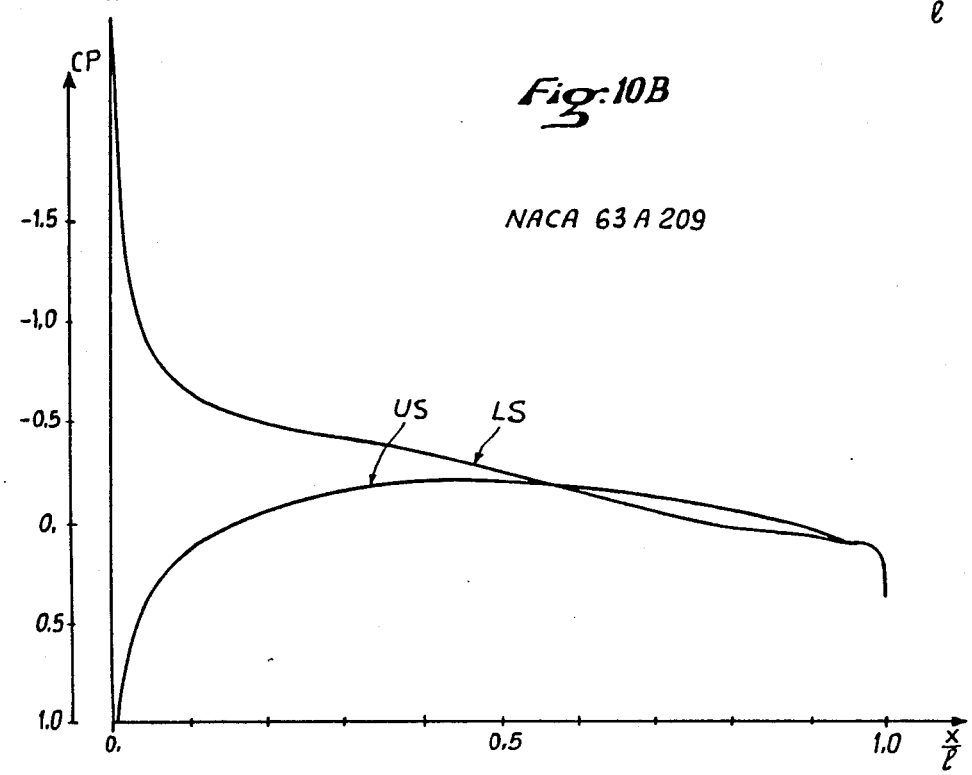
Figure 11A:
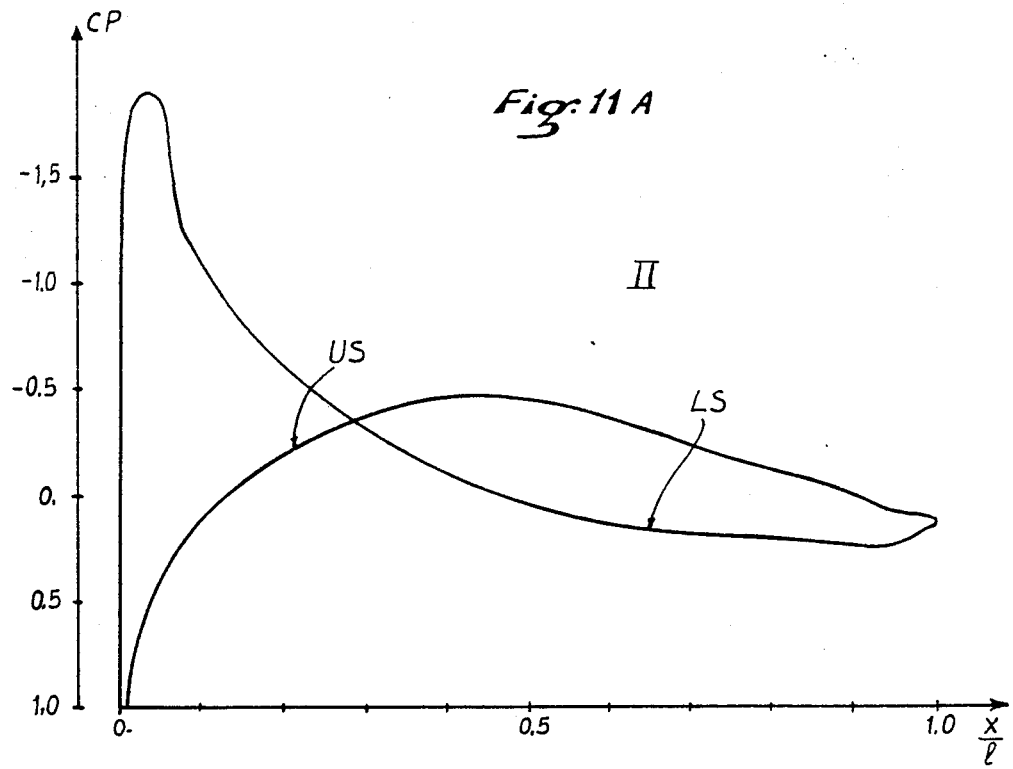
FIGS. 11A and 11B correspond respectively to FIGS. 9A and 9B for low values of coefficient of lift.
Figure 11B:
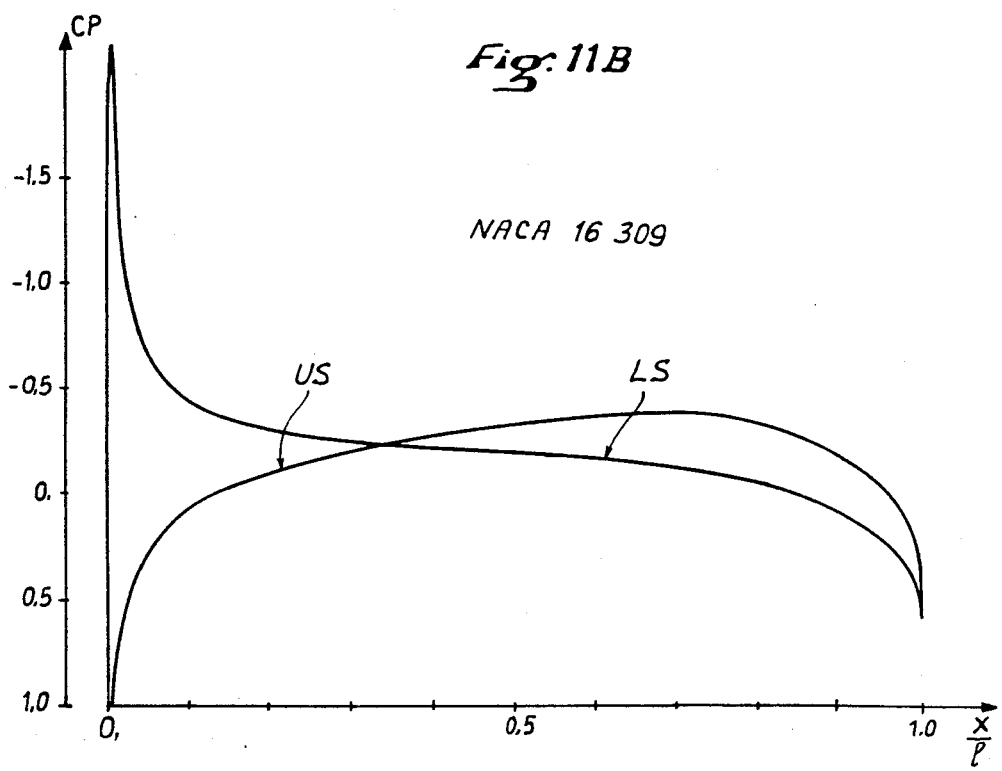

For higher Mach numbers and coefficients of lift, representative of the conditions enocuntered towards the end of the blade, the evolutions of curvature in the regions 2.2 avoid any formation of shock wave at the upper surface, as shown in FIGS. 9A and 9B, contrarily to the conventional NACA sections. The evolutions of curvature in region 2.3 ensure, furthermore, a progressive recompression of the flow, decreasing in intensity in the vicinity of the trailing edge, recompression avoiding a premature separation of the boundary layer, which gives the sections according to the invention low values of coefficient of drag for high coefficients of lift.

The evolutions of the curvature in regions 3.1 and 3.2 of the lower surface make it possible to obtain, for values of the coefficient of lift lower than the lift of adaptation, values of overspeeds at the lower surface which are lower, and recompressions of the flow which are more progressive than on the conventional sections, as shown in FIGS. 10A, 10B, 11A and 11B. The thickening of the boundary layer is therefore much less, which procures, for the sections according to the invention, a range of Cz of use for Cz's less than the Cz of adaptation which is much more extensive than on the existing sections. Furthermore, the evolutions of curvature in region 3.3 ensure a virtually constant speed level and avoid a sudden recompression of the flow in the vicinity of the trailing edge. Better values of the coefficient of drag obviously result therefrom.

Figure 12:
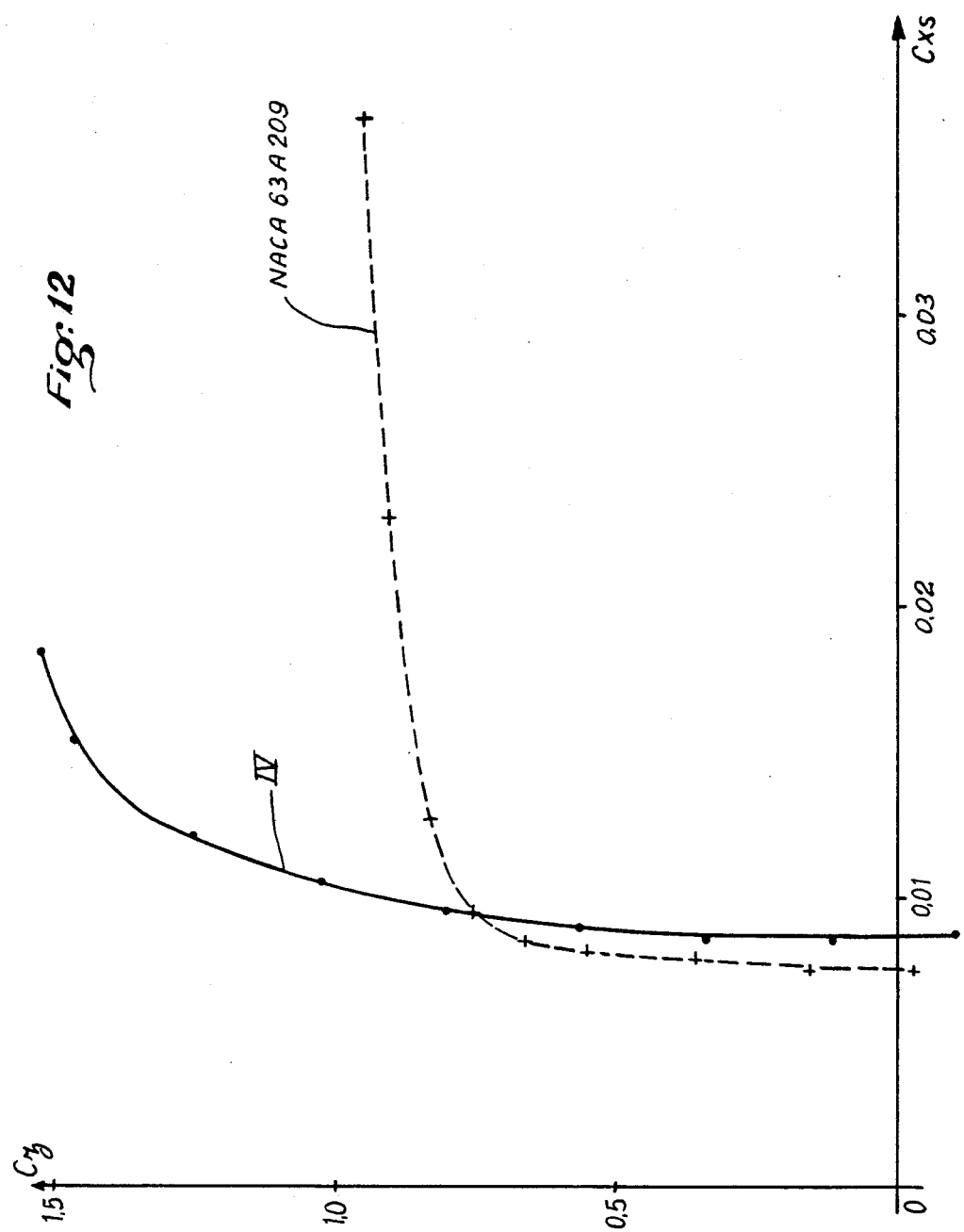
FIG. 12 represents the evolution of the coefficient of drag Cx as a function of the coefficient of lift Cz, at a Mach number equal to 0.5, for section IV of the invention and for the NACA 63A 209 section.

FIGS. 12 and 13 show the considerable increase of the range of correct operation in positive Cz obtained with the section according to the invention. These Figures also show the gain obtained on the operating range of the sections.

FIGS. 14 and 15 show that the gains in maximum lift obtained with the sections according to the invention are very considerable and sometimes exceed 50%.

For all the operating conditions of the sections of shrouded propeller blades, such as those used on transverse stabilization devices of helicopters or the lifting propellers of air-cushion vehicles, the sections according to the invention present better performances than the conventional sections, i.e. extensive ranges of lift with low levels of drag in a wide range of Mach numbers and of high values of maximum and minimum lift. These good performances are conserved for low values of the Reynolds number.

The sections according to the present invention therefore make it possible to create shrouded propeller blades enabling noteworthy values of the figure of merit and of the pull, as well as weakly loaded shrouded fan blades with variable pitch presenting good flowrate/pressure characteristics, to be obtained.

What is claimed is:

1. Section for shrouded propeller blade, of which the relative thickness with respect to the chord is included between 9% and 15%,
    wherein, the curvature of said section having a maximum value at the leading edge thereof included between 47 and 98 as a function of said relative thickness, the upper surface line of said section comprises, from the leading edge to the trailing edge, three successive portions, such that
    in the first portion, the curvature decreases rapidly from said maximum value at the leading edge to a value close to 20 at a first point of which the reduced abscissa along the chord of the section, counted from the leading edge, is close to 1%;
    in the second portion, the curvature decreases more slowly from said value close to 20 at said first point up to a value close to 1 at a second point, of which the reduced abscissa along said chord, counted from the leading edge, is close to 25%; and
    in the third portion, the curvature is less than 1 between said second point and said trailing edge, whilst the lower surface line of said section comprises, from the leading edge to the trailing edge, three successive portions, such that in the first portion, the curvature decreases from said maximum value at the leading edge to a value close to 11 at a third point of which the reduced abscissa along the chord of the section, counted from said leading edge, is close to 2%;

in the second portion, which extends from said third point up to a fourth point of which the reduced abscissa along the chord of the section, counted from said leading edge, is included between 30 and 70%, the curvature continues to decrease from this value close to 11 until it is cancelled; and in the third portion, the curvature is negative and less than 1 in absolute value, up to the trailing edge.

2. The section of claim 1, wherein the value COA of the curvature at the leading edge, with respect to the length 1 of the chord of the section, is given by the expression $$(1)\ COA = a1(e/1) + a2(e/1)^2 + a3(e/1)^3 + a4(e/1)^4 + a5(e/1)^5$$

in which $e/1$ is the maximum relative thickness of the section, and $a1, a2, a3, a4$ and $a5$ are constant coefficients.

3. The section of claim 2, wherein said constant coefficients have the following respective values:

$a1 = -0.2936.10^6$
$a2 = +0.99839.10^7$
$a3 = -0.12551.10^9$
$a4 = +0.69412.10^9$
$a5 = -0.14276.10^{10}$

4. The section of claim 1, wherein, along said second portion of upper surface, the curvature (CO) is given by the expression $$(2)\ \overline{CO}^{\frac{1}{2}} = a6 + a7(X/1)^{\frac{1}{2}} + a8(X/1),$$

in which $a6, a7$ and $a8$ are constant coefficients, $X/1$ being the reduced abscissa along the chord of the section, counted from the leading edge, of any point of this second portion.

5. The section of claim 4, wherein said constant coefficients have the following respective values:

$a6 = +0.72957.10$
$a7 = -0.31509.10^2$
$a8 = +0.37217.10^2$

6. The section of claim 1 and of which the coefficient of lift of adaptation is less than 0.3, wherein said third portion of upper surface comprises a point of inversion of curvature, of which the reduced abscissa along the chord of the section, counted from the leading edge, is included between 45% and 85%.

7. The section of claim 6, wherein the reduced abscissa of said point of inversion of curvature, along the chord of said section and counted from the leading edge, is given by the expression (3) $XE/1 = 0.58333 + 0.91667 Cza - 1.1667(Cza)^2$ in which $Cza$ is the value of the coefficient of lift of adaptation.

8. The section of claim 1, wherein the reduced abscissa of the point of zero curvature of said second portion of upper surface is given by the formula $$(4)\ X/1 = a9(e/1) + a10(e/1)^2 + a11(e/1)^3 a12(e/1)^4 + a13(e/1)^5$$

in which $e/1$ is the maximum relative thickness of the section (1) and $a9, a10, a11, a12$ and $a13$ are constant coefficients.

9. The section of claim 8, wherein said constant coefficients present the following respective values:

$a9 = -0.39176.10^3$
$a10 = +0.13407.10^5$
$a11 = -0.16845.10^6$
$a12 = +0.92807.10^6$
$a13 = -0.18878.10^7$

10. The section of claim 1, defined in known manner from a law of variation of thickness and from a median line, wherein, as a function of the reduced abscissa $X/1$ along the chord counted from the leading edge, the reduced ordinates $Y/1$ and $Ye/1$ of said median line and of said thickness are respectively given by the following formulae:

$$(5)\ Y/1 = c1(X/1) + c2(X/1)^2 + c3(X/1)^3 + c4(X/1)^4 + c5(X/1)^5 + c6(X/1)^6 + c7(X/1)^7$$

$$(6)\ Ye/1 = b1(X/1) + b2(X/1)^2 + b3(X/1)^3 + b4(X/1)^4 + b5(X/1)^5 + b6(X/1)^6 + b7(X/1)^7 + b8(X/1)^8 + b9(X/1)^9 + b10(X/1)^{10}$$

in which the different coefficients $b1$ to $b10$ and $c1$ to $c7$ are constant.

11. The section of claim 10, wherein the different constant coefficients $b1$ to $b10$ are given by the formulae hereinafter:

$$(7.1)\ b1 = b11(e/1) + b12(e/1)^2 + b13(e/1)^3 + b14(e/1)^4 + b15(e/1)^5 + b16(e/1)^6$$

$$(7.2)\ b2 = b21(e/1) + b22(e/1)^2 + b23(e/1)^3 + b24(e/1)^4 + b25(e/1)^5 + b26(e/1)^6$$

$$(7.10)\ b10 = b101(e/1) + b102(e/1)^2 + b103(e/1)^3 + b104(e/1)^4 + b105(e/1)^5 + b106(e/1)^6$$

in which $e/1$ is the maximum reduced thickness of said section and $b11$ to $106$ are constant coefficients.

12. The section of claim 11, wherein the constant coefficients $b11$ to $b106$ have the following respective values:

| | |
|---|---|
| $b11 = +0,98542.10^5$ | $b61 = -0,18709.10^{10}$ |
| $b12 = -0,43028.10^7$ | $b62 = +0,82093.10^{11}$ |
| $b13 = +0,74825.10^8$ | $b63 = -0,14340.10^{13}$ |
| $b14 = -0,64769.10^9$ | $b64 = +0,12464.10^{14}$ |
| $b15 = +0,27908.10^{10}$ | $b65 = -0,53912.10^{14}$ |
| $b16 = -0,47889.10^{10}$ | $b66 = +0,92831.10^{14}$ |
| $b21 = -0,33352.10^7$ | $b71 = +0,25348.10^{10}$ |
| $b22 = +0,14610.10^9$ | $b72 = -0,11123.10^{12}$ |
| $b23 = -0,25480.10^{10}$ | $b73 = +0,19432.10^{13}$ |
| $b24 = +0,22115.10^{11}$ | $b74 = -0,16892.10^{14}$ |
| $b25 = -0,95525.10^{11}$ | $b75 = +0,73066.10^{14}$ |
| $b26 = +0,16428.10^{12}$ | $b76 = -0,12582.10^{15}$ |
| $b31 = +0,39832.10^8$ | $b81 = -0,20869.10^{10}$ |
| $b32 = -0,17465.10^{10}$ | $b82 = +0,91583.10^{11}$ |
| $b33 = +0,30488.10^{11}$ | $b83 = -0,16000.10^{13}$ |
| $b34 = -0,26484.10^{12}$ | $b84 = -0,13909.10^{14}$ |
| $b35 = +0,11449.10^{13}$ | $b85 = -0,60166.10^{14}$ |
| $b36 = -0,19704.10^{13}$ | $b86 = +0,10361.10^{15}$ |
| $b41 = -0,24305.10^9$ | $b91 = +0,95554.10^9$ |
| $b42 = +0,10661.10^{11}$ | $b92 = -0,41936.10^{11}$ |
| $b43 = -0,18618.10^{12}$ | $b93 = +0,73266.10^{12}$ |
| $b44 = +0,16178.10^{13}$ | $b94 = -0,63693.10^{13}$ |
| $b45 = -0,69957.10^{13}$ | $b95 = +0,27553.10^{14}$ |
| $b46 = +0,12043.10^{14}$ | $b96 = -0,47450.10^{14}$ |
| $b51 = +0,86049.10^9$ | $b101 = -0,18663.10^9$ |
| $b52 = -0,37753.10^{11}$ | $b102 = +0,81909.10^{10}$ |
| $b53 = +0,65939.10^{12}$ | $b103 = -0,14311.10^{12}$ |
| $b54 = -0,57309.10^{13}$ | $b104 = +0,12441.10^{13}$ |
| $b55 = +0,24785.10^{14}$ | $b105 = -0,58321.10^{13}$ |

-continued

| | |
|---|---|
| b56 = −0,42674.10^14 | b106 = +0,92688.10^13 |

13. The section of claim 10, of which the median line presents a maximum relative curvature of between −2% and +5%,
wherein the different constant coefficients c1 to c7 are given by the following formulae:

$$(8.1)\ c1 = c11(e/1) + c12(e/1)^2 + c13(e/1)^3 + c14(e/1)^4 + c15(e/1)^5 + c16(e/1)^6$$

$$(8.2)\ c2 = c21(e/1) + c22(e/1)^2 + c23(e/1)^3 + c24(e/1)^4 + c25(e/1)^5 + c26(e/1)^6$$

$$(8.7)\ c7 = c71(e/1) + c72(e/1)^2 + c73(e/1)^3 + c74(e/1)^4 + c75(e/1)^5 + c76(e/1)^6$$

in which e/1 is the maximum reduced thickness of said section and c11 to c76 are constant coefficients.

14. The section of claim 13,
wherein the constant coefficients c11 to c76 have the following values:

| | |
|---|---|
| c11 = −0,29874.10^1 | c51 = −0,18750.10^4 |
| c12 = −0,61332.10^2 | c52 = +0,72410.10^5 |
| c13 = +0,60890.10^5 | c53 = +0,90745.10^7 |
| c14 = −0,43208.10^6 | c54 = −0,54687.10^9 |
| c15 = −0,12037.10^9 | c55 = +0,58423.10^10 |
| c16 = +0,24680.10^10 | c56 = +0,50242.10^11 |
| c21 = +0,17666.10^2 | c61 = +0,12366.10^4 |
| c22 = +0,70530.10^4 | c62 = −0,43178.10^5 |
| c23 = −0,40637.10^6 | c63 = −0,61307.10^7 |
| c24 = −0,28310.10^8 | c64 = +0,33946.10^9 |
| c25 = +0,20813.10^10 | c65 = −0,26651.10^10 |
| c26 = −0,31463.10^11 | c66 = −0,49209.10^11 |
| c31 = −0,38189.10^3 | c71 = −0,31247.10^3 |
| c32 = +0,31787.10^2 | c72 = +0,83939.10^4 |
| c33 = +0,23684.10^7 | c73 = +0,16280.10^7 |
| c34 = −0,47636.10^8 | c74 = −0,74431.10^8 |
| c35 = −0,26705.10^10 | c75 = +0,30520.10^8 |
| c36 = +0,65378.10^11 | c76 = +0,21265.10^11 |
| c41 = +0,13180.10^4 | |
| c42 = −0,44650.10^5 | |
| c43 = −0,65945.10^7 | |
| c44 = +0,35822.10^9 | |
| c45 = −0,24986.10^10 | |
| c46 = −0,58675.10^11 | |

15. The section of claim 10,
wherein the maximum relative camber Kmax of the median line of a section is determined, as a function of the value of the coefficient of lift of adaptation Cza, by the following formula:

$$(9)\ Kmax = d1(Cza) + d2(Cza)^2 + d3(Cza)^3 + d4(Cza)^4 + d5(Cza)^5 + d6(Cza)^6$$

in which d1 to d6 are constant coefficients.

16. The section of claim 15, wherein the constant coefficients d1 to d6 have the following values:
d1 = +0.11017
d2 = −0.30167
d3 = −0.58541
d4 = +0.39240.10
d5 = −0.53223.10
d6 = +0.22132.10

17. The section of claim 1, having a maximum relative thickness equal to 9.5% and for a coefficient of lift of adaptation equal to 1,
wherein, as a function of the reduced abscissa X/1 along the chord, counted from the leading edge, the reduced ordinates of its line of upper surface are given
between X/1=0 and X/1=0.39433, by the formula $$(10)\ Y/1 = f1(X/1)^{\frac{1}{2}} + f2(X/1) + f3(X/1)^2 + f4(X/1)^3 + f5(X/1)^4 + f6(X/1)^5 + f7(X/1)^6$$

with
f1 = +0.16227
f2 = −0.11704.10^{−1}
f3 = +0.13247
f4 = −0.25016.10
f5 = +0.10682.10^2
f6 = −0.22210.10^2
f7 = +0.17726.10^2
between X/1=0.39433 and X/1=1, by the formula $$(11)\ Y/1 = g0 + g1(X/1) + g2(X/1)^2 + g3(X/1)^3 + g4(X/1)^4 + g5(X/1)^5 + g6(X/1)^6$$

with
g0 = +0.22968
g1 = +0.17403.10
g2 = +0.77952.10
g3 = −0.17457.10^2
g4 = +0.20845.10^2
g5 = −0.13004.10^2
g6 = +0.33371.10
whilst the reduced ordinates of the line of lower surface of said section are given
between X/1=0 and X/1=0.11862, by the formula $$(12)\ Y/1 = h1(X/1)^{\frac{1}{2}} + h2(X/1) + h3(X/1)^2 + h4(X/1)^3 + h5(X/1)^4 + h6(X/1)^5 + h7(X/1)^6$$

with
h1 = −0.13971
h2 = +0.10480.10^{−3}
h3 = +0.51698.10
h4 = −0.11297.10^3
h5 = +0.14695.10^4
h6 = −0.96403.10^4
h7 = +0.24769.10^5
between X/1=0.11862 and X/1=1, by the formula $$(13)\ Y/1 = i0 + i1(X/1) + i2(X/1)^2 + i3(X/1)^3 + i4(X/1)^4 + i5(X/1)^5 + i6(X/1)^6$$

with
i0 = −0.25915.10^{−1}
i1 = −0.96597.10^{−1}
i2 = +0.49503
i3 = +0.60418.10^{−1}
i4 = −0.17206.10
i5 = +0.20619.10
i6 = −0.77922

18. The section of claim 1, having a maximum relative thickness equal to 10.2% and for a coefficient of lift of adaptation equal to 0.9, wherein, as a function of the reduced abscissa X/1 along the chord, counted from the leading edge,
the reduced ordinates of the line of upper surface are given
between X/1=0 and X/1=0.39503, by the formula $$(14)\ Y/1 = j1(X/1)^{\frac{1}{2}} + j2(X/1) + j3(X/1)^2 + j4(X/1)^3 + j5(X/1)^4 + j6(X/1)^5 + j7(X/1)^6$$

with
j1 = +0.14683
j2 = −0.67115.10^{−2}
j3 = +0.44720 j4=−0.36828.10
j5=+0.12651.10²
j6=−0.23835.10²
j7=+0.18155.10² between X/1=0.39503 and X/1=1, by the formula

(15) $Y/1 = k0 + k1(X/1) + k2(X/1)^2 + k3(X/1)^3 + k4(X/1)^4 + k5(X/1)^5 + k6(X/1)^6$ with
k0=+0.45955
k1=−0.39834.10
k2=+0.16726.10²
k3=−0.35737.10²
k4=+0.41088.10²
k5=−0.24557.10²
k6=+0.60088.10 whilst the reduced ordinates of the line of lower surface of said section are given
between X/1=0 and X/1=0.14473, by the formula

(16) $Y/1 = m1(X/1)^{1/2} + m2(X/1) + m3(X/1)^2 + m4(X/1)^3 + m5(X/1)^4 + m6(X/1)^5 + m7(X/1)^6$ with
m1=−0.13297
m2=+0.36163.10⁻¹
m3=+0.17284.10
m4=−0.27664.10²
m5=+0.30633.10³
m6=31 0.16978.10⁴
m7=+0.36477.10⁴ between X/1=0.14473 and X/1=1, by the formula

(17) $Y/1 = n0 + n1(X/1) + n2(X/1)^2 + n3(X/1)^3 + n4(X/1)^4 + n5(X/1)^5 + n6(X/1)^6$ with
n0=−0.30824.10⁻¹
n1=−0.20564.10⁻¹
n2=−0.21738
n3=+0.24105.10
n4=−0.53752.10
n5=+0.48110.10
n6=−0.15826.10

19. The section of claim 1, having a maximum relative thickness equal to 11.7% and for a coefficient of lift of adaptation equal to 0.5,
wherein, as a function of the reduced abscissa X/1 along the chord, counted from the leading edge, the reduced ordinates of the line of upper surface are given
between X/1=0 and X/1=0.28515, by the formula

(18) $Y/1 = t1(X/1)^{1/2} + t2(X/1) + t3(X/1)^2 + t4(X/1)^3 + t5(X/1)^4 + t6(X/1)^5 + t7(X/1)^6$ with
t1=+0.21599
t2=−0.17294
t3=+0.22044.10
t4=−0.26595.10²
t5=+0.14642.10³
t6=−0.39764.10³
t7=+0.42259.10³ between X/1=0.28515 and X/1=1, by the formula

(19) $Y/1 = u0 + u1(X/1) + u2(X/1)^2 + u3(X/1)^3 + u4(X/1)^4 + u5(X/1)^5 + u6(X/1)^6$ with
u0=+0.39521.10⁻¹
u1=+0.26170
u3=−0.40872
u4=+0.15968.10
u5=−0.15222.10
u6=+0.51057 whilst the reduced ordinated of the line of lower surface of said section are given
between X/1=0 and X/1=0.17428, by the formula

(20) $Y/1 = v1(X/1)^{1/2} + v2(X/1) + v3(X/1)^2 + v4(X/1)^3 + v5(X/1)^4 + v6(X/1)^5 + v7(X/1)^6$ with
v1=−0.16526
v2=−0.31162.10⁻¹
v3=+0.57567.10
v4=−0.10148.10³
v5=+0.95843.10³
v6=−0.44161.10⁴
v7=+0.78519.10⁴ between X/1=0.17428 and X/1=1, by the formula

(21) $Y/1 = w0 + w1(X/1) + W2(X/1)^2 + w3(X/1)^3 + w4(X/1)^4 + w5(X/1)^5 + w6(W/1)^6$ with
w0=−0.25152.10⁻¹
w1=−0.22525
w2=+0.89038
w3=−0.10131.10
w4=+0.16240
w5=+0.46968
w6=−0.26400

20. The section of claim 1, having a maximum relative thickness equal to 12% and for a coefficient of lift of adaptation equal to 0.6
wherein, as a function of the reduced abscissa X/1 along the chord, counted from the leading edge, the reduced ordinates of the line of upper surface are given
between X/1=0 and X/1=0.29461, by the formula

(22) $Y/1 = p1(X/1)^{1/2} + p2(X/1) + p3(X/1)^2 + p4(X/1)^3 + p5(X/1)^4 + p6(X/1)^5 + p7(X/1)^6$ with
p1=+0.16347
p2=+0.20845
p3=−0.20506.10
p4=+0.13223.10²
p5=−0.63791.10²
p6=+0.16200.10³
p7=−0.16302.10³ between X/1=0.29461 and X/1=1, by the formula

(23) $Y/1 = q0 + q1(X/1) + q2(X/1)^2 + q3(X/1)^3 + q4(X/1)^4 + q5(X/1)^5 + q6(X/1)^6$ with
q0=+0.54860.10⁻¹
q1=+0.13872
q2=+0.16460
q3=−0.17424.10
q4=+0.28085.10
q5=−0.19062.10
q6=+0.48442 whilst the reduced ordinates of the line of lower surface of said section are given
between X/1=0 and X/1=0.14931, by the formula

(24) $Y/1 = r1(X/1)^{1/2} + r2(X/1) + r3(X/1)^2 + r4(X/1)^3 + r5(X/1)^4 + r6(X/1)^5 + r7(X/1)^6$ with r1 = −0.19086
r2 = +0.29842
r3 = −0.51359.10
r4 = +0.11144.10³
r5 = −0.11385.10⁴
r6 = +0.56797.10⁴
r7 = −0.11091.10⁵ between $X/1 = 0.14931$ and $X/1 = 1$, by the formula

(25) $Y/1 = s0 + s1(X/1) + s2(X/1)^2 + s3(X/1)^3 + s4(X/1)^4 + s5(X/1)^5 + s6(X/1)^6$ with
s0 = −0.31248.10⁻¹
s1 = −0.12350
s2 = +0.42720
s3 = +0.32923
s4 = −0.19650.10
s5 = +0.21099.10
s6 = −0.74935

21. The section of claim 1, having a maximum relative thickness equal to 12.8% and for a coefficient of lift of adaptation equal to 0.2, wherein, as a function of the reduced abscissa X/1 along the chord, counted from the leading edge,
   the reduced ordinates of the line of upper surface are given
   between $X/1 = 0$ and $X/1 = 0.26861$, by the formula

(26) $Y/1 = \alpha1(X/1)^{\frac{1}{2}} + \alpha2(X/1) + \alpha3(X/1)^2 \alpha4(X/1)^{\frac{3}{2}} + \alpha5(X/1)^4 + \alpha6(X/1)^5 + \alpha7(X/1)^6$ with
α1 = +0.19762
α2 = +0.17213
α3 = −0.53137.10
α4 = +0.56025.10²
α5 = −0.32319.10³
α6 = +0.92088.10³
α7 = −0.10229.10⁴ between $X/1 = 0.26861$ and $X/1 = 1$, by the formula

(27) $Y/1 = \beta0 + \beta1(X/1) + \beta2(X/1)^2 + \beta3(X/1)^3 + \beta4(X/1)^4 + \beta5(X/1)^5 + \beta6(X/1)^6$ with
β0 = +0.28900.10⁻¹
β1 = +0.38869
β2 = −0.10796.10
β3 = +0.80848
β4 = +0.45025
β5 = −0.10636.10
β6 = +0.47182 whilst the reduced ordinates of the line of lower surface of said section are given
   between $X/1 = 0$ and $X/1 = 0.20934$, by the formula

(28) $Y/1 = \gamma1(X/1)^{\frac{1}{2}} + \gamma2(X/1) + \gamma3(X/1)^2 + \gamma4(X/1)^3 + \gamma5(X/1)^4 + \gamma6(X/1)^5 + \gamma7(X/1)^6$ with
γ1 = −0.25376
γ2 = +0.61860
γ3 = −0.96212.10
γ4 = +0.12843.10³
γ5 = −0.90701.10³
γ6 = +0.32291.10⁴
γ7 = −0.45418.10⁴ between $X/1 = 0.20934$ and $X/1 = 1$, by the formula

(29) $Y/1 = \delta0 + \delta1(X/1) + \delta2(X/1)^2 + \delta3(X/1)^3 + \delta4(X/1)^4 + \delta5(X/1)^5 + \delta6(X/1)^6$ with
δ0 = −0.25234.10⁻¹
δ1 = −0.32905
δ2 = +0.10890.10
δ3 = −0.10066.10
δ4 = −0.32520
δ5 = +0.11325.10
δ6 = −0.54043

22. The section of claim 1, having a maximum relative thickness equal to 13.9% and for a coefficient of lift of adaptation equal to −0.1,
   wherein, as a function of the reduced abscissa X/1 along the chord, counted from the leading edge,
   the reduced ordinates of the line of upper surface are given
   between $X/1 = 0$ and $X/1 = 0.19606$, by the formula

(30) $Y/1 = \epsilon1(X/1)^{\frac{1}{2}} + \epsilon2(X/1) + \epsilon3(X/1)^2 + \epsilon4(X/1)^3 + \epsilon5(X/1)^4 + \epsilon6(X/1)^5 + \epsilon7(X/1)^6$ with
ε1 = +0.22917
ε2 = −0.22972
ε3 = +0.21262.10
ε4 = −0.39557.10²
ε5 = +0.32628.10³
ε6 = −0.13077.10⁴
ε7 = +0.20370.10⁴ between $X/1 = 0.19606$ and $X/1 = 1$, by the formula

(31) $Y/1 = \lambda0 + \lambda1(X/1) + \lambda2(X/1)^2 + \lambda3(X/1)^3 + 804(X/1)^4 + \lambda5(X/1)^5 + \lambda6(X/1)^6$ with
λ0 = +0.32500.10⁻¹
λ1 = +0.29684
λ2 = −0.99723
λ = +0.82973
λ4 = +0.40616
λ5 = −0.10053.10
λ6 = +0.44222 whilst the reduced ordinates of the line of lower surface of said section are given
   between $X/1 = 0$ and $X/1 = 0.26478$, by the formula

(32) $Y/1 = \mu1(X/1)^{178} + \mu2(X/1) + \mu3(X/1)^2 + \mu4(X/1)^3 + \mu5(X/1)^4 + \mu6(X/1)^5 + \mu7(X/1)^6$ with
μ1 = −0.19314
μ2 = −0.22031
μ3 = +0.41399.10
μ4 = −0.41389.10²
μ5 = +0.23230.10³
μ6 = −0.66179.10³
μ7 = +0.74216.10³ between $X/1 = 0.26478$ and $X/1 = 1$, by the formula

(33) $Y/1 = \nu0 + \nu1(X/1) + \nu2(X/1)^2 + \nu3(X/1)^3 + \nu4(X/1)^4 + \nu5(X/1)^5 + \nu6(X/1)^6$ with
ν0 = −0.42417.10⁻¹
ν1 = −0.29161
ν2 = +0.57883
ν3 = +0.41309
ν4 = −0.19045.10
ν5 = +0.18776.10
ν6 = −0.63583

23. The section of claim 1, wherein it is used for Mach numbers of adaptation Mad which, as a function of the maximum relative thickness e/1 of said section, vary according to formula

(34) $Mad = \phi 0 + \phi 1 (e/1)$ with
$\phi 0 = -0.88636.10$
$\phi 1 = +0.15320.10.$

* * * * *